(12) United States Patent
Meiri et al.

(10) Patent No.: US 7,380,082 B2
(45) Date of Patent: May 27, 2008

(54) READING VIRTUAL ORDERED WRITES AT LOCAL STORAGE DEVICE

(75) Inventors: David Meiri, Cambridge, MA (US); Mark J. Halstead, Watertown, MA (US); Benjamin W. Yoder, Framingham, MA (US); Haim Kopylovitz, Newton, MA (US); Hana Moreshet, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 535 days.

(21) Appl. No.: 10/606,699

(22) Filed: Jun. 26, 2003

(65) Prior Publication Data

US 2004/0193802 A1    Sep. 30, 2004

Related U.S. Application Data

(63) Continuation-in-part of application No. 10/396,786, filed on Mar. 25, 2003, now Pat. No. 6,898,685.

(51) Int. Cl.
*G06F 12/00* (2006.01)
*G06F 13/00* (2006.01)
*G06F 13/28* (2006.01)
*G06F 17/30* (2006.01)

(52) U.S. Cl. ............. 711/162; 711/161; 707/203; 707/204

(58) Field of Classification Search ......... 711/113, 711/118, 135, 141, 154, 161–162, 165; 707/10, 707/203–204
See application file for complete search history.

(56) References Cited

U.S. PATENT DOCUMENTS

| | | | | |
|---|---|---|---|---|
| 5,276,848 A | * | 1/1994 | Gallagher et al. | 711/121 |
| 5,555,371 A | * | 9/1996 | Duyanovich et al. | 714/13 |
| 5,778,430 A | | 7/1998 | Ish et al. | |
| 5,901,327 A | * | 5/1999 | Ofek | 710/5 |
| 6,012,063 A | * | 1/2000 | Bodnar | 707/101 |
| 6,038,651 A | * | 3/2000 | VanHuben et al. | 712/21 |
| 6,192,408 B1 | | 2/2001 | Vahalia et al. | |

(Continued)

OTHER PUBLICATIONS

Article re: Network Appliance™ SnapMirror® Software ; found on Network Appliance, Inc. web page; www.netapp.com/ftp/snapmirror.pdf.

*Primary Examiner*—Sanjiv Shah
*Assistant Examiner*—Yaima Campos
(74) *Attorney, Agent, or Firm*—Muirhead and Saturnelli, LLC

(57) ABSTRACT

Using a local storage device to read desired data stored on a remote storage device that receives chunks of data from the local storage device includes, if the desired data is entirely in a cache of the local storage device, the local storage device returning the data from the cache and, if the desired data is not entirely in a cache of the local storage device, reading data from the remote storage device to the local storage device and the local storage device merging the data from the remote storage device with data from the local storage device at the local storage device. Using a local storage device to read desired data stored on a remote storage device that receives chunks of data from the local storage device may also include, prior to reading data from the remote storage device to the local storage device, creating a temporary storage area at the local storage device if there is data from the local storage device that is to be read. The temporary storage area may be a scratch slot.

12 Claims, 15 Drawing Sheets

U.S. PATENT DOCUMENTS

| | | |
|---|---|---|
| 6,415,292 B1 | 7/2002 | Kamvysselis |
| 6,553,464 B1 * | 4/2003 | Kamvysselis et al. ...... 711/148 |
| 6,609,183 B2 * | 8/2003 | Ohran ........................ 711/161 |
| 6,615,320 B2 * | 9/2003 | Arimilli et al. ............. 711/141 |
| 6,687,801 B1 * | 2/2004 | Kamvysselis ............... 711/162 |
| 6,880,045 B2 * | 4/2005 | Pong et al. ................. 711/135 |
| 2002/0116404 A1 * | 8/2002 | Cha et al. ................... 707/202 |
| 2004/0034754 A1 * | 2/2004 | Schreiber .................... 711/165 |

* cited by examiner

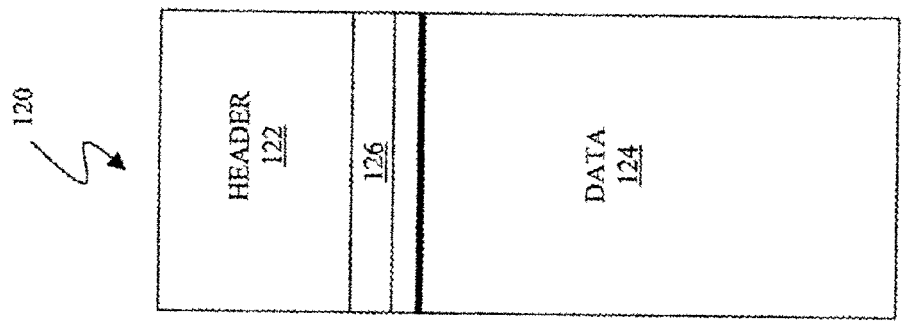
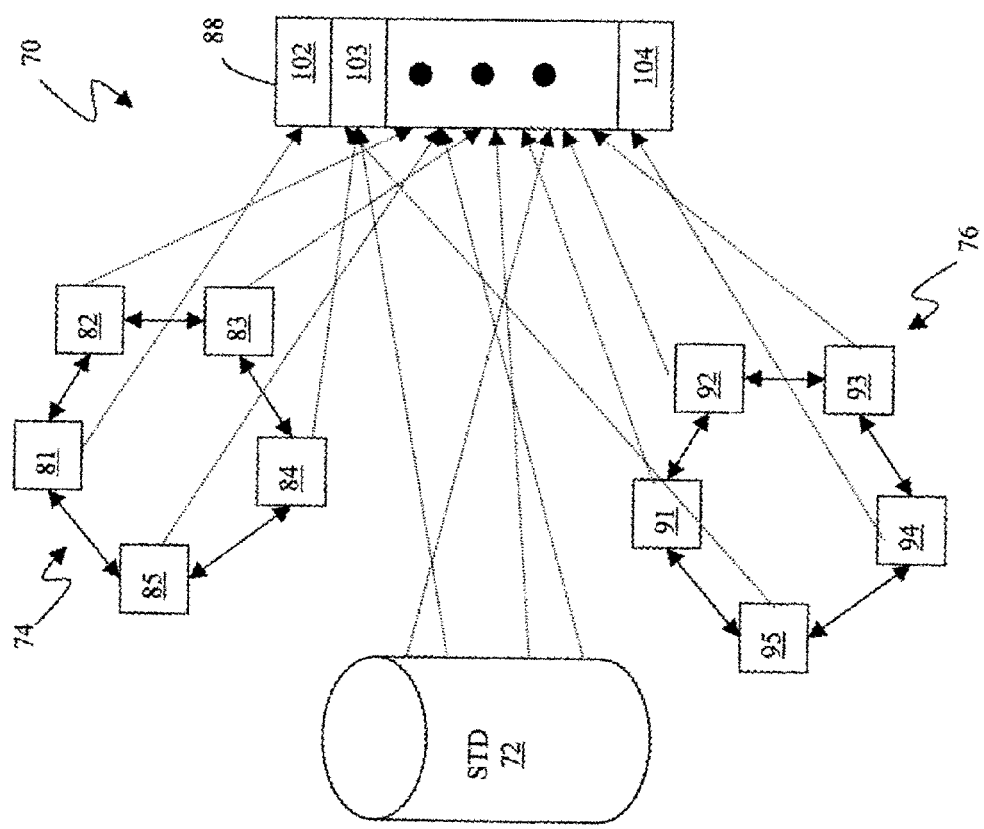

READING VIRTUAL ORDERED WRITES AT LOCAL STORAGE DEVICE

CROSS REFERENCE TO RELATED APPLICATIONS

This application is a continuation-in-part of U.S. patent application Ser. No. 10/396,786 filed on Mar. 25, 2003 now U.S. Pat. No. 6,898,685 which is incorporated by reference herein.

BACKGROUND OF THE INVENTION

1. Technical Field

This application relates to computer storage devices, and more particularly to the field of transferring data between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by the Remote Data Facility (RDF) product provided by EMC Corporation of Hopkinton, Mass. With RDF, a first storage device, denoted the "primary storage device" (or "R1") is coupled to the host. One or more other storage devices, called "secondary storage devices" (or "R2") receive copies of the data that is written to the primary storage device by the host. The host interacts directly with the primary storage device, but any data changes made to the primary storage device are automatically provided to the one or more secondary storage devices using RDF. The primary and secondary storage devices may be connected by a data link, such as an ESCON link, a Fibre Channel link, and/or a Gigabit Ethernet link. The RDF functionality may be facilitated with an RDF adapter (RA) provided at each of the storage devices.

RDF allows synchronous data transfer where, after data written from a host to a primary storage device is transferred from the primary storage device to a secondary storage device using RDF, receipt is acknowledged by the secondary storage device to the primary storage device which then provides a write acknowledge back to the host. Thus, in synchronous mode, the host does not receive a write acknowledge from the primary storage device until the RDF transfer to the secondary storage device has been completed and acknowledged by the secondary storage device.

A drawback to the synchronous RDF system is that the latency of each of the write operations is increased by waiting for the acknowledgement of the RDF transfer. This problem is worse when there is a long distance between the primary storage device and the secondary storage device; because of transmission delays, the time delay required for making the RDF transfer and then waiting for an acknowledgement back after the transfer is complete may be unacceptable.

It is also possible to use RDF in an a semi-synchronous mode, in which case the data is written from the host to the primary storage device which acknowledges the write immediately and then, at the same time, begins the process of transferring the data to the secondary storage device. Thus, for a single transfer of data, this scheme overcomes some of the disadvantages of using RDF in the synchronous mode. However, for data integrity purposes, the semi-synchronous transfer mode does not allow the primary storage device to transfer data to the secondary storage device until a previous transfer is acknowledged by the secondary storage device. Thus, the bottlenecks associated with using RDF in the synchronous mode are simply delayed by one iteration because transfer of a second amount of data cannot occur until transfer of previous data has been acknowledged by the secondary storage device.

Another possibility is to have the host write data to the primary storage device in asynchronous mode and have the primary storage device copy data to the secondary storage device in the background. The background copy involves cycling through each of the tracks of the primary storage device sequentially and, when it is determined that a particular block has been modified since the last time that block was copied, the block is transferred from the primary storage device to the secondary storage device. Although this mechanism may attenuate the latency problem associated with synchronous and semi-synchronous data transfer modes, a difficulty still exists because there can not be a guarantee of data consistency between the primary and secondary storage devices. If there are problems, such as a failure of the primary system, the secondary system may end up with out-of-order changes that make the data unusable.

A proposed solution to this problem is the Symmetrix Automated Replication (SAR) process, which is described in pending U.S. patent applications Ser. Nos. 10/224,918 and 10/225,021, both of which were filed on Aug. 21, 2002. The SAR uses devices (BCV's) that can mirror standard logical devices. A BCV device can also be split from its standard logical device after being mirrored and can be resynced (i.e., reestablished as a mirror) to the standard logical devices after being split. However, using the SAR process requires the significant overhead of continuously splitting and resyncing the BCV's. The SAR process also uses host control and management, which relies on the controlling host being operational. In addition, the cycle time for a practical implementation of a SAR process is on the order of twenty to thirty minutes, and thus the amount of data that may be lost when an RDF link and/or primary device fails could be twenty to thirty minutes worth of data.

Thus, it would be desirable to have an RDF system that exhibits some of the beneficial qualities of each of the different techniques discussed above while reducing the drawbacks. Such a system would exhibit low latency for each host write regardless of the distance between the primary device and the secondary device and would provide consistency (recoverability) of the secondary device in case of failure.

SUMMARY OF THE INVENTION

According to the present invention, ordering data writes include a host computer providing a plurality of data writes to a primary storage device, the primary storage device assigning a first sequence number to data writes begun after a first time and before a second time, the primary storage device assigning a second sequence number, different from the first sequence number, to data writes begun after the second time, in response to completion of all writes assigned the first sequence number, the primary storage device transferring writes assigned the first sequence number to a secondary storage device, and, in response to the primary storage device transferring all writes assigned the first sequence number to the secondary storage device, the primary storage device sending a commit message to the secondary storage device. Ordering data writes may also include, in response to receiving a commit message from the primary storage device, the secondary storage device storing the data writes having the first sequence number. Ordering data writes may also include, in response to storing all of the data writes having the first sequence number, the secondary storage device sending an acknowledgement to the primary storage device. Ordering data writes may also include, following sending a commit message to the secondary storage device, the primary storage device suspending transferring data to the secondary storage device. Ordering data writes may also include, following suspending transferring data, the primary storage device assigning a third sequence number, different from the first and second sequence numbers, to subsequent data writes. Ordering data writes may also include, in response to the secondary storage device sending an acknowledgement to the primary storage device, the primary storage device resuming transferring data to the secondary storage device. Ordering data writes may also include providing data writes to cache slots of the primary storage device. Ordering data writes may also include, in response to a data write being assigned the second sequence number corresponding to a cache slot already assigned the first sequence number, copying the data to a new cache slot. Ordering data writes may also include the primary storage device using a first list of pointers to the cache slots for data writes assigned the first sequence number and the primary storage device using a second list of pointers to the cache slots for data writes assigned the second sequence number. Ordering data writes may also include providing a cache stamp field in a header portion of each of the slots, the cache stamp field including a sequence number associated with the slot. The cache stamp field may also include a password field that is written when the slot is first used. Ordering data writes may also include, in response to a slot no longer being used, clearing the password field. Ordering data writes may also include the primary storage device using a first cache only virtual device for the cache slots corresponding to data writes assigned the first sequence number and the primary storage device using a second cache only virtual device for the cache slots corresponding to data writes assigned the second sequence number.

According further to the present invention, storing ordered writes to a remote storage device includes receiving a commit message for data associated with a first sequence number, in response to data associated with a second sequence number different from said first sequence number not yet being stored, waiting for the data associated with the second sequence number to be stored, and initiating storage of the data associated with the first sequence number. Storing ordered writes may also include acknowledging the commit message. Storing ordered writes may also include constructing a list of modified slots in connection with receiving data associated with the first sequence number. Initiating storage of data associated with the first sequence number may include traversing the list of modified slots.

According further to the present invention, computer software that orders data writes includes executable code that assigns a first sequence number to data writes begun after a first time and before a second time, executable code that assigns a second sequence number, different from the first sequence number, to data writes begun after the second time, executable code that transfers writes assigned the first sequence number to a storage device in response to completion of all writes assigned the first sequence number, and executable code that sends a commit message to the storage device after transferring all writes assigned the first sequence number. The computer software may also include executable code that suspends transferring data to the storage device after sending a commit message thereto. The computer software may also include executable code that assigns a third sequence number, different from the first and second sequence numbers, to subsequent data writes following suspending transferring data. The computer software may also include executable code that resumes transferring data to the storage device in response to the storage device acknowledging handling the commit. The computer software may also include executable code that provides data writes to cache slots. The computer software may also include executable code that copies data to a new cache slot in response to a data write being assigned the second sequence number corresponding to a cache slot already assigned the first sequence number. The computer software may also include executable code that uses a first list of pointers to the cache slots for data writes assigned the first sequence number an executable code that uses a second list of pointers to the cache slots for data writes assigned the second sequence number. The computer software may also include executable code that provides a cache stamp field in a header portion of each of the slots, the cache stamp field including a sequence number associated with the slot. The cache stamp field may also include a password field that is written when the slot is first used. The computer software may also include executable code that clears the password field in response to a slot no longer being used. The computer software may also include executable code that uses a first cache only virtual device for the cache slots corresponding to data writes assigned the first sequence number and executable code that uses a second cache only virtual device for the cache slots corresponding to data writes assigned the second sequence number.

According further to the present invention, computer software that stores ordered writes to a remote storage device includes executable code that receives a commit message for data associated with a first sequence number, executable code that waits for the data associated with the second sequence number to be stored in response to data associated with a second sequence number different from the first sequence number not yet being stored, and executable code that initiates storage of the data associated with the first sequence number. The computer software may also include executable code that acknowledges the commit message. The computer software may also include executable code that constructs a list of modified slots in connection with receiving data associated with the first sequence number. Executable code that initiates storage of data associated with the first sequence number may include executable code that traverses the list of modified slots.

According further to the present invention, using a local storage device to read desired data stored on a remote storage device that receives chunks of data from the local storage device includes, if the desired data is entirely in a cache of the local storage device, the local storage device returning the data from the cache and, if the desired data is not entirely in a cache of the local storage device, reading data from the remote storage device to the local storage device and the local storage device merging the data from the remote storage device with data from the local storage device at the local storage device. Using a local storage device to read desired data stored on a remote storage device that receives chunks of data from the local storage device may also include, prior to reading data from the remote storage device to the local storage device, creating a temporary storage area at the local storage device if there is data from the local storage device that is to be read. The temporary storage area may be a scratch slot. Using a local storage device to read desired data stored on a remote storage device that receives chunks of data from the local storage device may also include,prior to creating a temporary storage area, locking slots of the local storage device that correspond to of data from the local storage device that is to be read. Using a local storage device to read desired data stored on a remote storage device that receives chunks of data from the local storage device may also include, after merging the data, unlocking the slots of the local storage device that correspond to of data from the local storage device that is to be read. The data from the local storage area may be merged on top of data from the remote storage area. Using a local storage device to read desired data stored on a remote storage device that receives chunks of data from the local storage device may also include the remote storage device allocating a temporary storage area in response to data to be read being stored in a cache slot of the remote storage device. Using a local storage device to read desired data stored on a remote storage device that receives chunks of data from the local storage device may also include reading data from the disk of the remote storage area into the temporary storage area, and merging the data to be read stored in the cache slot with data from a disk in the temporary storage area. Using a local storage device to read desired data stored on a remote storage device that receives chunks of data from the local storage device may also include, prior to the remote storage area determining if there is data to be read stored in a cache slot of the remote storage device, the remote storage device writing at least a portion of the data from at least one cache slot of the remote storage device to a disk of the remote storage device.

According further to the present invention, computer software that reads desired data stored on a remote storage device that receives chunks of data from a local storage device, includes executable code that returns the data from the cache if the desired data is entirely in a cache of the local storage device, and, executable code that reads data from the remote storage device to the local storage device and merges the data from the remote storage device with data from the local storage device at the local storage device if the desired data is not entirely in a cache of the local storage device. The software may also include executable code that creates a temporary storage area at the local storage device if there is data from the local storage device that is to be read prior to reading data from the remote storage device to the local storage device. The temporary storage area may be a scratch slot. The software may also include executable code that locks slots of the local storage device that correspond to of data from the local storage device that is to be read prior to creating a temporary storage area. The software may also include executable code that unlocks the slots of the local storage device that correspond to of data from the local storage device that is to be read after merging the data. The data from the local storage area may be merged on top of data from the remote storage area. The software may also include executable code that allocates a temporary storage area at the remote storage device in response to data to be read being stored in a cache slot of the remote storage device. The software may also include executable code that reads data from the disk of the remote storage area into the temporary storage area, and, executable code that merges the data to be read stored in the cache slot with data from a disk in the temporary storage area. The software may also include executable code that writes at least a portion of the data from at least one cache slot of the remote storage device to a disk of the remote storage device prior to the remote storage area determining if there is data to be read stored in a cache slot of the remote storage device.

BRIEF DESCRIPTION OF THE DRAWINGS

FIG. 3 is a schematic diagram illustrating items for constructing and manipulating chunks of data on a local storage device according to the system described herein.

FIG. 4 is a diagram illustrating a data structure for a slot used in connection with the system described herein.

DETAILED DESCRIPTION OF VARIOUS EMBODIMENTS

Figure 1:
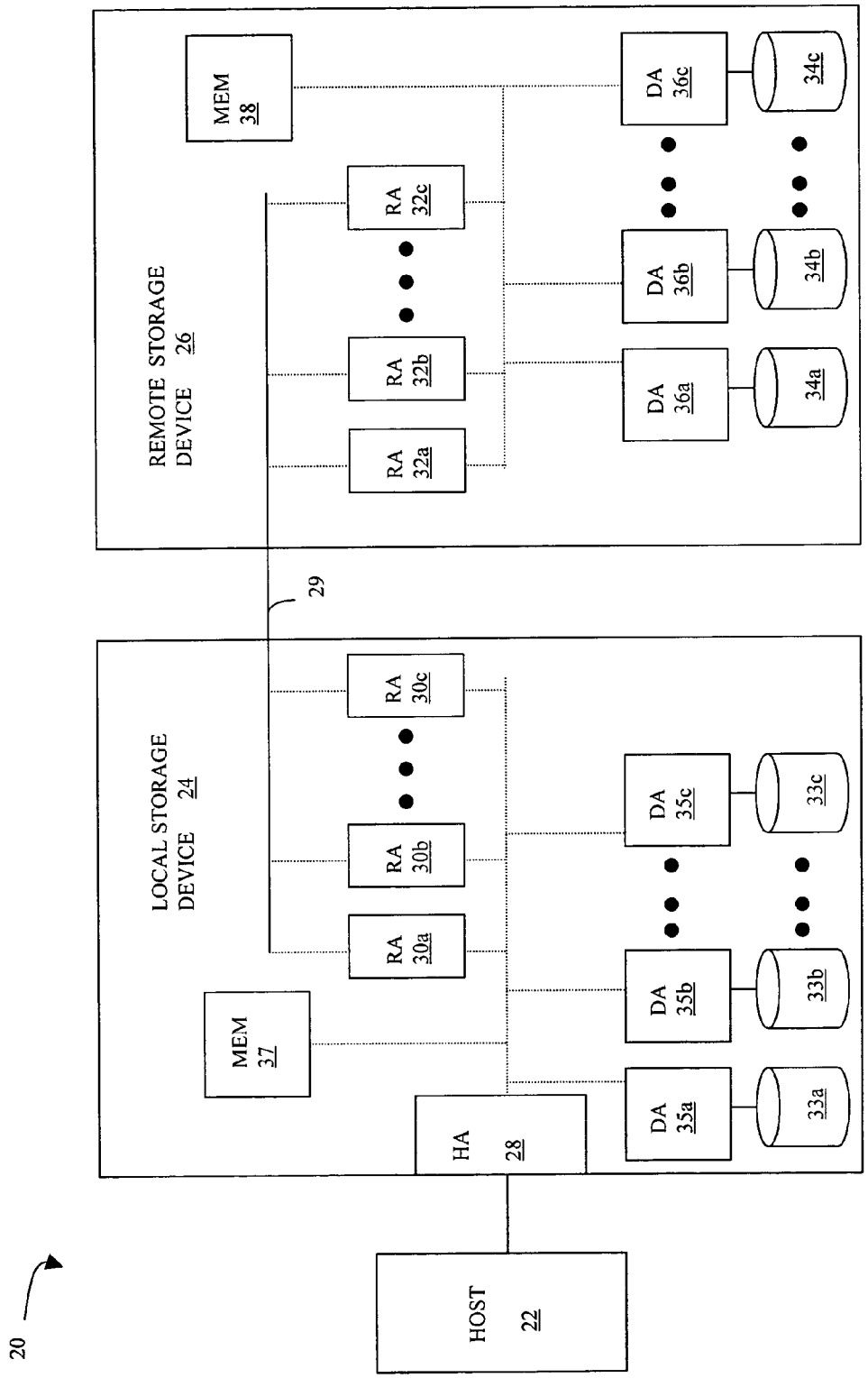
FIG. 1 is a schematic diagram showing a host, a local storage device, and a remote data storage device used in connection with the system described herein.

Referring to FIG. 1, a diagram 20 shows a relationship between a host 22, a local storage device 24 and a remote storage device 26. The host 22 reads and writes data from and to the local storage device 24 via a host adapter (HA) 28, which facilitates the interface between the host 22 and the local storage device 24. Although the diagram 20 only shows one host 22 and one HA 28, it will be appreciated by one of ordinary skill in the art that multiple HA's may be used and that one or more HA's may have one or more hosts coupled thereto.

Data from the local storage device 24 is copied to the remote storage device 26 via an RDF link 29 to cause the data on the remote storage device 26 to be identical to the data on the local storage device 24. Although only the one link 29 is shown, it is possible to have additional links between the storage devices 24, 26 and to have links between one or both of the storage devices 24, 26 and other storage devices (not shown). Note that there may be a time delay between the transfer of data from the local storage device 24 to the remote storage device 26, so that the remote storage device 26 may, at certain points in time, contain data that is not identical to the data on the local storage device 24. Communication using RDF is described, for example, in U.S. Pat. No. 5,742,792, which is incorporated by reference herein.

The local storage device 24 includes a first plurality of RDF adapter units (RA's) 30a, 30b, 30c and the remote storage device 26 includes a second plurality of RA's 32a-32c. The RA's 30a-30c, 32a-32c are coupled to the RDF link 29 and are similar to the host adapter 28, but are used to transfer data between the storage devices 24, 26. The software used in connection with the RA's 30a-30c, 32a-32c is discussed in more detail hereinafter.

The storage devices 24, 26 may include one or more disks, each containing a different portion of data stored on each of the storage devices 24, 26. FIG. 1 shows the storage device 24 including a plurality of disks 33a, 33b, 33c and the storage device 26 including a plurality of disks 34a, 34b, 34c. The RDF functionality described herein may be applied so that the data for at least a portion of the disks 33a-33c of the local storage device 24 is copied, using RDF, to at least a portion of the disks 34a-34c of the remote storage device 26. It is possible that other data of the storage devices 24, 26 is not copied between the storage devices 24, 26, and thus is not identical.

Each of the disks 33a-33c is coupled to a corresponding disk adapter unit (DA) 35a, 35b, 35c that provides data to a corresponding one of the disks 33a-33c and receives data from a corresponding one of the disks 33a-33c. Similarly, a plurality of DA's 36a, 36b, 36c of the remote storage device 26 are used to provide data to corresponding ones of the disks 34a-34c and receive data from corresponding ones of the disks 34a-34c. An internal data path exists between the DA's 35a-35c, the HA 28 and the RA's 30a-30c of the local storage device 24. Similarly, an internal data path exists between the DA's 36a-36c and the RA's 32a-32c of the remote storage device 26. Note that, in other embodiments, it is possible for more than one disk to be serviced by a DA and that it is possible for more than one DA to service a disk.

The local storage device 24 also includes a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and the RA's 30a-30c, and a cache for data fetched from one or more of the disks 33a-33c. Similarly, the remote storage device 26 includes a global memory 38 that may contain tasks that are to be performed by one or more of the DA's 36a-36c and the RA's 32a-32c, and a cache for data fetched from one or more of the disks 34a-34c. Use of the memories 37, 38 is described in more detail hereinafter.

The storage space in the local storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 that comprises the disks 34a-34c may be subdivided into a plurality of volumes or logical devices, where each of the logical devices may or may not correspond to one or more of the disks 34a-34c.

Providing an RDF mapping between portions of the local storage device 24 and the remote storage device 26 involves setting up a logical device on the remote storage device 26 that is a remote mirror for a logical device on the local storage device 24. The host 22 reads and writes data from and to the logical device on the local storage device 24 and the RDF mapping causes modified data to be transferred from the local storage device 24 to the remote storage device 26 using the RA's, 30a-30c, 32a-32c and the RDF link 29. In steady state operation, the logical device on the remote storage device 26 contains data that is identical to the data of the logical device on the local storage device 24. The logical device on the local storage device 24 that is accessed by the host 22 is referred to as the "R1 volume" (or just "R1") while the logical device on the remote storage device 26 that contains a copy of the data on the R1 volume is called the "R2 volume" (or just "R2"). Thus, the host reads and writes data from and to the R1 volume and RDF handles automatic copying and updating of the data from the R1 volume to the R2 volume.

Figure 2:
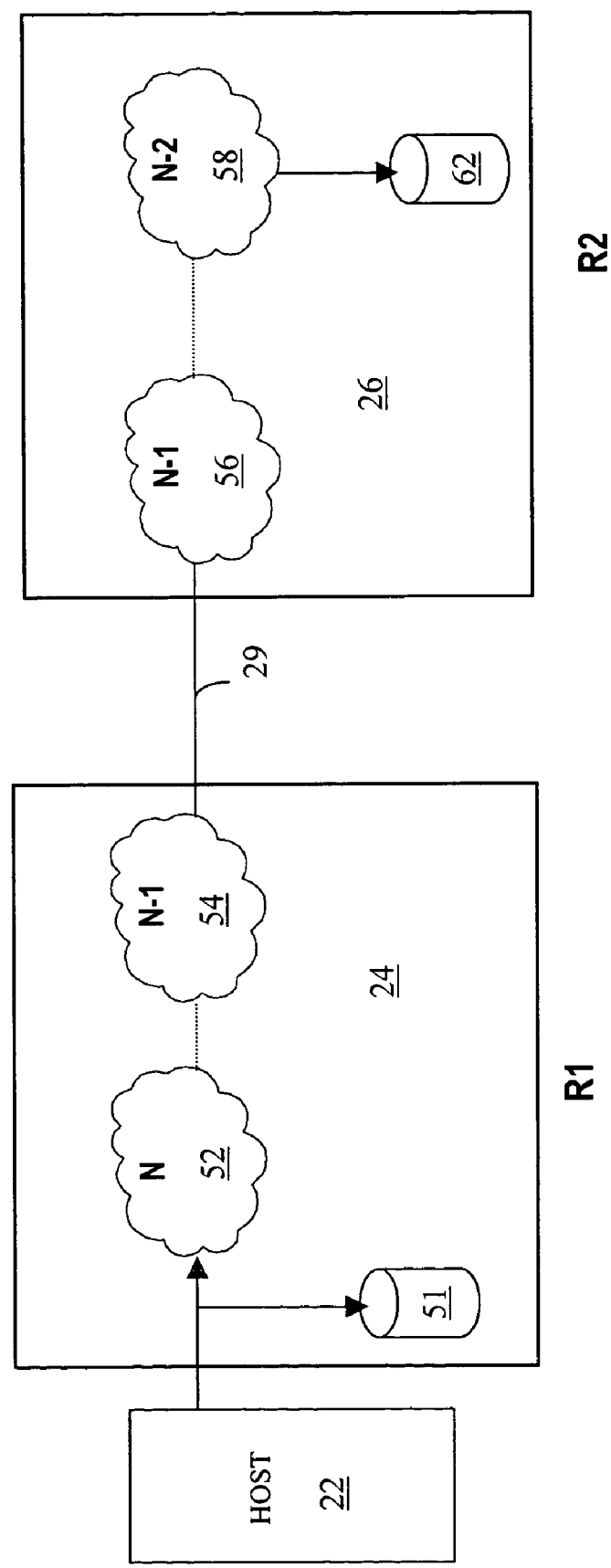
FIG. 2 is a schematic diagram showing a flow of data between a host, a local storage device, and a remote data storage device used in connection with the system described herein.

FIG. 2 illustrates a path of data from the host 22 to the local storage device 24 and the remote storage device 26. Data written from the host 22 to the local storage device 24 is stored locally, as illustrated by the data element 51 of the local storage device 24. The data that is written by the host 22 to the local storage device 24 is also maintained by the local storage device 24 in connection with being sent by the local storage device 24 to the remote storage device 26 via the link 29.

In the system described herein, each data write by the host 22 (of, for example a record, a plurality of records, a track, etc.) is assigned a sequence number. The sequence number may be provided in an appropriate data field associated with the write. In FIG. 2, the writes by the host 22 are shown as being assigned sequence number N. All of the writes performed by the host 22 that are assigned sequence number N are collected in a single chunk of data 52. The chunk 52 represents a plurality of separate writes by the host 22 that occur at approximately the same time.

Generally, the local storage device 24 accumulates chunks of one sequence number while transmitting a previously accumulated chunk (having the previous sequence number) to the remote storage device 26. Thus, while the local storage device 24 is accumulating writes from the host 22 that are assigned sequence number N, the writes that occurred for the previous sequence number (N-1) are transmitted by the local storage device 24 to the remote storage device 26 via the link 29. A chunk 54 represents writes from the host 22 that were assigned the sequence number N-1 that have not been transmitted yet to the remote storage device 26.

The remote storage device 26 receives the data from the chunk 54 corresponding to writes assigned a sequence number N-1 and constructs a new chunk 56 of host writes having sequence number N-1. The data may be transmitted using appropriate RDF protocol that acknowledges data sent across the link 29. When the remote storage device 26 has received all of the data from the chunk 54, the local storage device 24 sends a commit message to the remote storage device 26 to commit all the data assigned the N-1 sequence number corresponding to the chunk 56. Generally, once a chunk corresponding to a particular sequence number is committed, that chunk may be written to the logical storage device. This is illustrated in FIG. 2 with a chunk 58 corresponding to writes assigned sequence number N-2 (i.e., two before the current sequence number being used in connection with writes by the host 22 to the local storage device 26). In FIG. 2, the chunk 58 is shown as being written to a data element 62 representing disk storage for the remote storage device 26. Thus, the remote storage device 26 is receiving and accumulating the chunk 56 corresponding to sequence number N-1 while the chunk 58 corresponding to the previous sequence number (N-2) is being written to disk storage of the remote storage device 26 illustrated by the data element 62. In some embodiments, the data for the chunk 58 is marked for write (but not necessarily written immediately), while the data for the chunk 56 is not.

Thus, in operation, the host 22 writes data to the local storage device 24 that is stored locally in the data element 51 and is accumulated in the chunk 52. Once all of the data for a particular sequence number has been accumulated (described elsewhere herein), the local storage device 24 increments the sequence number. Data from the chunk 54 corresponding to one less than the current sequence number is transferred from the local storage device 24 to the remote storage device 26 via the link 29. The chunk 58 corresponds to data for a sequence number that was committed by the local storage device 24 sending a message to the remote storage device 26. Data from the chunk 58 is written to disk storage of the remote storage device 26.

Note that the writes within a particular one of the chunks 52, 54, 56, 58 are not necessarily ordered. However, as described in more detail elsewhere herein, every write for the chunk 58 corresponding to sequence number N-2 was begun prior to beginning any of the writes for the chunks 54, 56 corresponding to sequence number N-1. In addition, every write for the chunks 54, 56 corresponding to sequence number N-1 was begun prior to beginning any of the writes for the chunk 52 corresponding to sequence number N. Thus, in the event of a communication failure between the local storage device 24 and the remote storage device 26, the remote storage device 26 may simply finish writing the last committed chunk of data (the chunk 58 in the example of FIG. 2) and can be assured that the state of the data at the remote storage device 26 is ordered in the sense that the data element 62 contains all of the writes that were begun prior to a certain point in time and contains no writes that were begun after that point in time. Thus, R2 always contains a point in time copy of R1 and it is possible to reestablish a consistent image from the R2 device.

Referring to FIG. 3, a diagram 70 illustrates items used to construct and maintain the chunks 52, 54. A standard logical device 72 contains data written by the host 22 and corresponds to the data element 51 of FIG. 2 and the disks 33a-33c of FIG. 1. The standard logical device 72 contains data written by the host 22 to the local storage device 26.

Two linked lists of pointers 74, 76 are used in connection with the standard logical device 72. The linked lists 74, 76 correspond to data that may be stored, for example, in the memory 37 of the local storage device 24. The linked list 74 contains a plurality of pointers 81-85, each of which points to a slot of a cache 88 used in connection with the local storage device 24. Similarly, the linked list 76 contains a plurality of pointers 91-95, each of which points to a slot of the cache 88. In some embodiments, the cache 88 may be provided in the memory 37 of the local storage device 24. The cache 88 contains a plurality of cache slots 102-104 that may be used in connection to writes to the standard logical device 72 and, at the same time, used in connection with the linked lists 74, 76.

Each of the linked lists 74, 76 may be used for one of the chunks of data 52, 54 so that, for example, the linked list 74 may correspond to the chunk of data 52 for sequence number N while the linked list 76 may correspond to the chunk of data 54 for sequence number N-1. Thus, when data is written by the host 22 to the local storage device 24, the data is provided to the cache 88 and, in some cases (described elsewhere herein), an appropriate pointer of the linked list 74 is created. Note that the data will not be removed from the cache 88 until the data is destaged to the standard logical device 72 and the data is also no longer pointed to by one of the pointers 81-85 of the linked list 74, as described elsewhere herein.

In an embodiment herein, one of the linked lists 74, 76 is deemed "active" while the other is deemed "inactive". Thus, for example, when the sequence number N is even, the linked list 74 may be active while the linked list 76 is inactive. The active one of the linked lists 74, 76 handles writes from the host 22 while the inactive one of the linked lists 74, 76 corresponds to the data that is being transmitted from the local storage device 24 to the remote storage device 26.

While the data that is written by the host 22 is accumulated using the active one of the linked lists 74, 76 (for the sequence number N), the data corresponding to the inactive one of the linked lists 74, 76 (for previous sequence number N-1) is transmitted from the local storage device 24 to the remote storage device 26. The RA's 30a-30c use the linked lists 74, 76 to determine the data to transmit from the local storage device 24 to the remote storage device 26.

Once data corresponding to a particular one of the pointers in one of the linked lists 74, 76 has been transmitted to the remote storage device 26, the particular one of the pointers may be removed from the appropriate one of the linked lists 74, 76. In addition, the data may also be marked for removal from the cache 88 (i.e., the slot may be returned to a pool of slots for later, unrelated, use) provided that the data in the slot is not otherwise needed for another purpose (e.g., to be destaged to the standard logical device 72). A mechanism may be used to ensure that data is not removed from the cache 88 until all devices are no longer using the data. Such a mechanism is described, for example, in U.S. Pat. No. 5,537,568 issued on Jul. 16, 1996 and in U.S. patent application Ser. No. 09/850,551 filed on Jul. 7, 2001, both of which are incorporated by reference herein.

Referring to FIG. 4, a slot 120, like one of the slots 102-104 of the cache 88, includes a header 122 and data 124. The header 122 corresponds to overhead information used by the system to manage the slot 120. The data 124 is the corresponding data from the disk that is being (temporarily) stored in the slot 120. Information in the header 122 includes pointers back to the disk, time stamp(s), etc.

The header 122 also includes a cache stamp 126 used in connection with the system described herein. In an embodiment herein, the cache stamp 126 is eight bytes. Two of the bytes are a "password" that indicates whether the slot 120 is being used by the system described herein. In other embodiments, the password may be one byte while the following byte is used for a pad. As described elsewhere herein, the two bytes of the password (or one byte, as the case may be) being equal to a particular value indicates that the slot 120 is pointed to by at least one entry of the linked lists 74, 76. The password not being equal to the particular value indicates that the slot 120 is not pointed to by an entry of the linked lists 74, 76. Use of the password is described elsewhere herein.

The cache stamp 126 also includes a two-byte field indicating the sequence number (e.g., N, N-1, N-2, etc.) of the data 124 of the slot 120. As described elsewhere herein, the sequence number field of the cache stamp 126 may be used to facilitate the processing described herein. The remaining four bytes of the cache stamp 126 may be used for a pointer, as described elsewhere herein. Of course, the two bytes of the sequence number and the four bytes of the pointer are only valid when the password equals the particular value that indicates that the slot 120 is pointed to by at least one entry in one of the lists 74, 76.

Figure 5:
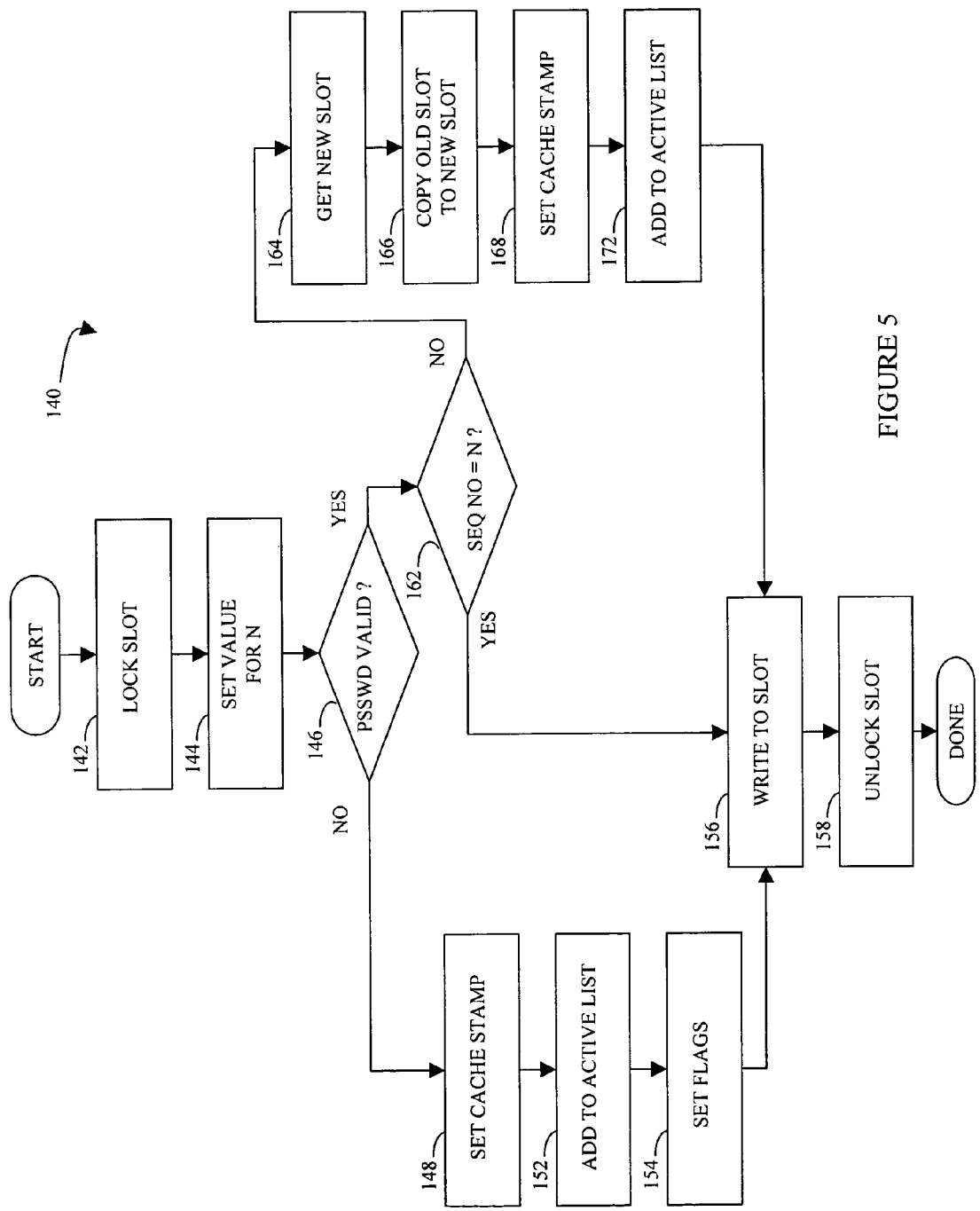
FIG. 5 is a flow chart illustrating operation of a host adaptor (HA) in response to a write by a host according to the system described herein.

Referring to FIG. 5, a flow chart 140 illustrates steps performed by the HA 28 in connection with a host 22 performing a write operation. Of course, when the host 22 performs a write, processing occurs for handling the write in a normal fashion irrespective of whether the data is part of an R1/R2 RDF group. For example, when the host 22 writes data for a portion of the disk, the write occurs to a cache slot which is eventually destaged to the disk. The cache slot may either be a new cache slot or may be an already existing cache slot created in connection with a previous read and/or write operation to the same track.

Processing begins at a first step 142 where a slot corresponding to the write is locked. In an embodiment herein, each of the slots 102-104 of the cache 88 corresponds to a track of data on the standard logical device 72. Locking the slot at the step 142 prevents additional processes from operating on the relevant slot during the processing performed by the HA 28 corresponding to the steps of the flow chart 140.

Following step 142 is a step 144 where a value for N, the sequence number, is set. As discussed elsewhere herein, the value for the sequence number obtained at the step 144 is maintained during the entire write operation performed by the HA 28 while the slot is locked. As discussed elsewhere herein, the sequence number is assigned to each write to set the one of the chunks of data 52, 54 to which the write belongs. Writes performed by the host 22 are assigned the current sequence number. It is useful that a single write operation maintain the same sequence number throughout.

Following the step 144 is a test step 146 which determines if the password field of the cache slot is valid. As discussed above, the system described herein sets the password field to a predetermined value to indicate that the cache slot is already in one of the linked lists of pointers 74, 76. If it is determined at the test step 146 that the password field is not valid (indicating that the slot is new and that no pointers from the lists 74, 76 point to the slot), then control passes from the step 146 to a step 148, where the cache stamp of the new slot is set by setting the password to the predetermined value, setting the sequence number field to N, and setting the pointer field to Null. In other embodiments, the pointer field may be set to point to the slot itself.

Following the step 148 is a step 152 where a pointer to the new slot is added to the active one of the pointer lists 74, 76. In an embodiment herein, the lists 74, 76 are circular doubly linked lists, and the new pointer is added to the circular doubly linked list in a conventional fashion. Of course, other appropriate data structures could be used to manage the lists 74, 76. Following the step 152 is a step 154 where flags are set. At the step 154, the RDF_WP flag (RDF write pending flag) is set to indicate that the slot needs to be transmitted to the remote storage device 26 using RDF. In addition, at the step 154, the IN_CACHE flag is set to indicate that the slot needs to be destaged to the standard logical device 72. Following the step 154 is a step 156 where the data being written by the host 22 and the HA 28 is written to the slot. Following the step 156 is a step 158 where the slot is unlocked. Following step 158, processing is complete.

If it is determined at the test step 146 that the password field of the slot is valid (indicating that the slot is already pointed to by at least one pointer of the lists 74, 76), then control transfers from the step 146 to a test step 162, where it is determined whether the sequence number field of the slot is equal to the current sequence number, N. Note that there are two valid possibilities for the sequence number field of a slot with a valid password. It is possible for the sequence number field to be equal to N, the current sequence number. This occurs when the slot corresponds to a previous write with sequence number N. The other possibility is for the sequence number field to equal N-1. This occurs when the slot corresponds to a previous write with sequence number N-1. Any other value for the sequence number field is invalid. Thus, for some embodiments, it may be possible to include error/validity checking in the step 162 or possibly make error/validity checking a separate step. Such an error may be handled in any appropriate fashion, which may include providing a message to a user.

If it is determined at the step 162 that the value in the sequence number field of the slot equals the current sequence number N, then no special processing is required and control transfers from the step 162 to the step 156, discussed above, where the data is written to the slot. Otherwise, if the value of the sequence number field is N-1 (the only other valid value), then control transfers from the step 162 to a step 164 where a new slot is obtained. The new slot obtained at the step 164 may be used store the data being written.

Following the step 164 is a step 166 where the data from the old slot is copied to the new slot that was obtained at the step 164. Note that that the copied data includes the RDF_WP flag, which should have been set at the step 154 on a previous write when the slot was first created. In other embodiments, multiple RDF_WP flags for all of the records of the new slot are all cleared. Following the step 166 is a step 168 where the cache stamp for the new slot is set by setting the password field to the appropriate value, setting the sequence number field to the current sequence number, N, and setting the pointer field to point to the old slot. Following the step 168 is a step 172 where a pointer to the new slot is added to the active one of the linked lists 74, 76. Following the step 172 is the step 156, discussed above, where the data is written to the slot which, in this case, is the new slot.

Figure 6:
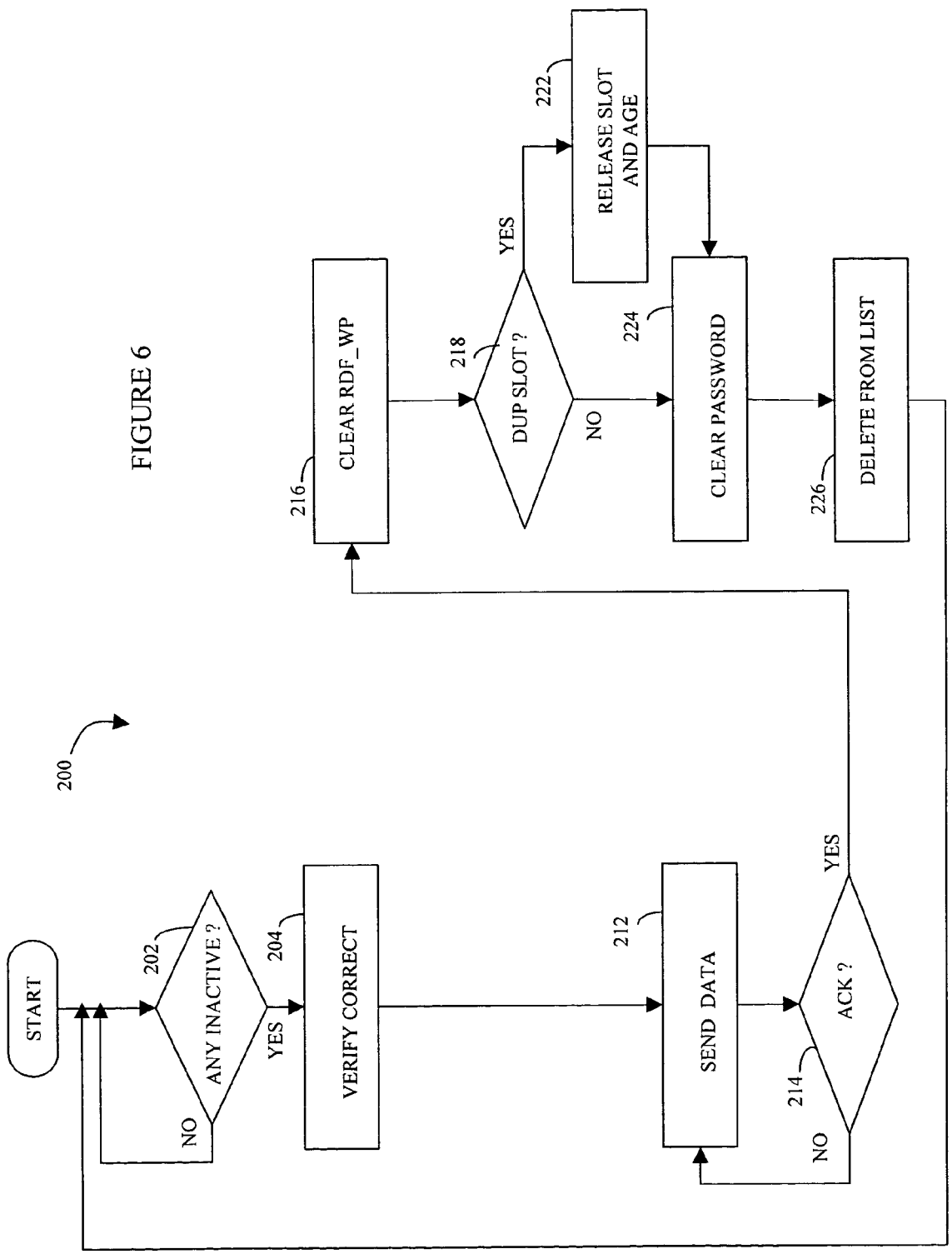
FIG. 6 is a flow chart illustrating transferring data from a local storage device to a remote storage device according to the system described herein.

Referring to FIG. 6, a flow chart 200 illustrates steps performed in connection with the RA's 30*a*-30*c* scanning the inactive one of the lists 72, 74 to transmit RDF data from the local storage device 24 to the remote storage device 26. As discussed above, the inactive one of the lists 72, 74 points to slots corresponding to the N-1 cycle for the R1 device when the N cycle is being written to the R1 device by the host using the active one of the lists 72, 74.

Processing begins at a first step 202 where it is determined if there are any entries in the inactive one of the lists 72, 74. As data is transmitted, the corresponding entries are removed from the inactive one of the lists 72, 74. In addition, new writes are provided to the active one of the lists 72, 74 and not generally to the inactive one of the lists 72, 74. Thus, it is possible (and desirable, as described elsewhere herein) for the inactive one of the lists 72, 74 to contain no data at certain times. If it is determined at the step 202 that there is no data to be transmitted, then the inactive one of the lists 72, 74 is continuously polled until data becomes available. Data for sending becomes available in connection with a cycle switch (discussed elsewhere herein) where the inactive one of the lists 72, 74 becomes the active one of the lists 72, 74, and vice versa.

If it is determined at the step 202 that there is data available for sending, control transfers from the step 202 to a step 204, where the slot is verified as being correct. The processing performed at the step 204 is an optional "sanity check" that may include verifying that the password field is correct and verifying that the sequence number field is correct. If there is incorrect (unexpected) data in the slot, error processing may be performed, which may include notifying a user of the error and possibly error recovery processing.

Following the step 204 is a step 212, where the data is sent via RDF in a conventional fashion. In an embodiment herein, the entire slot is not transmitted. Rather, only records within the slot that have the appropriate mirror bits set (indicating the records have changed) are transmitted to the remote storage device 26. However, in other embodiments, it may be possible to transmit the entire slot, provided that the remote storage device 26 only writes data corresponding to records having appropriate mirror bits set and ignores other data for the track, which may or may not be valid. Following the step 212 is a test step 214 where it is determined if the data that was transmitted has been acknowledged by the R2 device. If not, the data is resent, as indicated by the flow from the step 214 back to the step 212. In other embodiments, different and more involved processing may used to send data and acknowledge receipt thereof. Such processing may include error reporting and alternative processing that is performed after a certain number of attempts to send the data have failed.

Once it is determined at the test step 214 that the data has been successfully sent, control passes from the step 214 to a step 216 to clear the RDF_WP flag (since the data has been successfully sent via RDF). Following the step 216 is a test step 218 where it is determined if the slot is a duplicate slot created in connection with a write to a slot already having an existing entry in the inactive one of the lists 72, 74. This possibility is discussed above in connection with the steps 162, 164, 166, 168, 172. If it is determined at the step 218 that the slot is a duplicate slot, then control passes from the step 218 to a step 222 where the slot is returned to the pool of available slots (to be reused). In addition, the slot may also be aged (or have some other appropriate mechanism applied thereto) to provide for immediate reuse ahead of other slots since the data provided in the slot is not valid for any other purpose. Following the step 222 or the step 218 if the slot is not a duplicate slot is a step 224 where the password field of the slot header is cleared so that when the slot is reused, the test at the step 146 of FIG. 5 properly classifies the slot as a new slot.

Following the step 224 is a step 226 where the entry in the inactive one of the lists 72, 74 is removed. Following the step 226, control transfers back to the step 202, discussed above, where it is determined if there are additional entries on the inactive one of the lists 72, 74 corresponding to data needing to be transferred.

Figure 7:
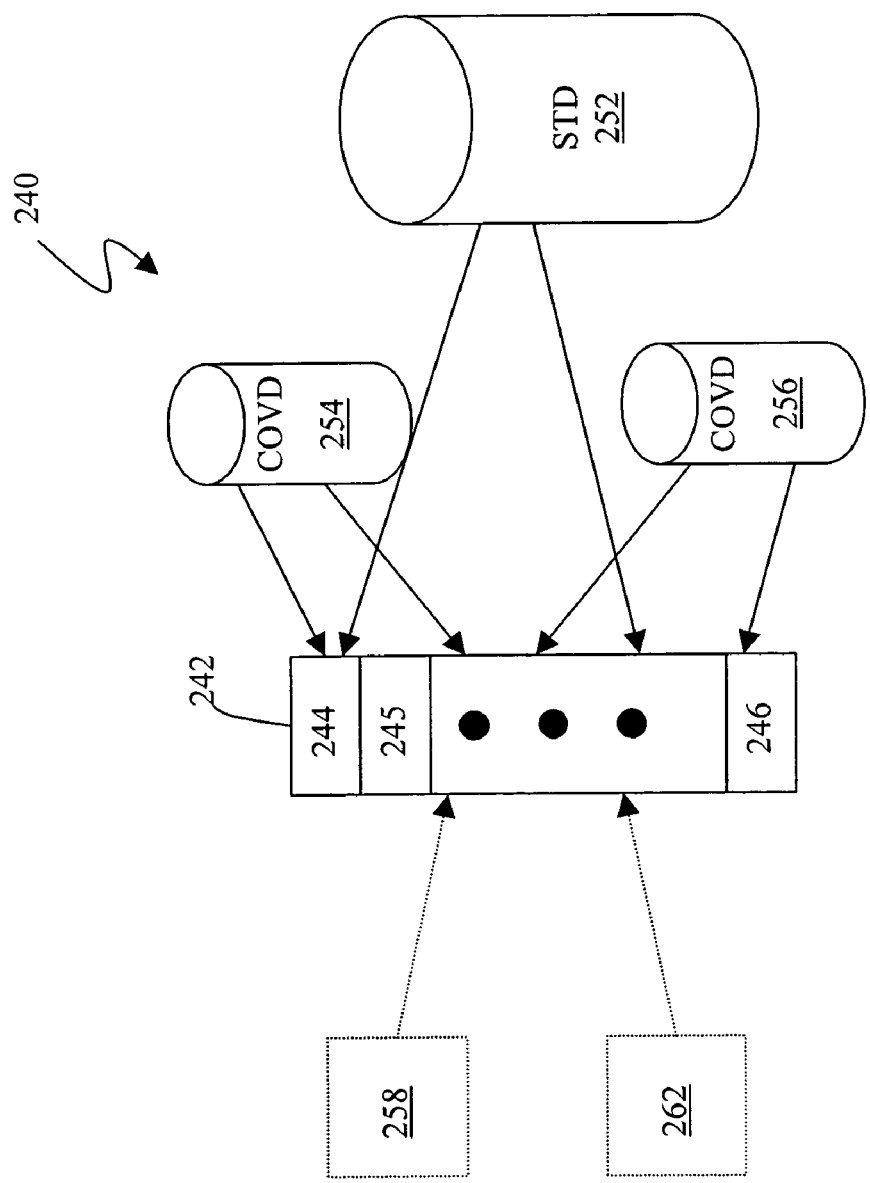
FIG. 7 is a schematic diagram illustrating items for constructing and manipulating chunks of data on a remote storage device according to the system described herein.

Referring to FIG. 7, a diagram 240 illustrates creation and manipulation of the chunks 56, 58 used by the remote storage device 26. Data that is received by the remote storage device 26, via the link 29, is provided to a cache 242 of the remote storage device 26. The cache 242 may be provided, for example, in the memory 38 of the remote storage device 26. The cache 242 includes a plurality of cache slots 244-246, each of which may be mapped to a track of a standard logical storage device 252. The cache 242 is similar to the cache 88 of FIG. 3 and may contain data that can be destaged to the standard logical storage device 252 of the remote storage device 26. The standard logical storage device 252 corresponds to the data element 62 shown in FIG. 2 and the disks 34*a*-34*c* shown in FIG. 1.

The remote storage device 26 also contains a pair of cache only virtual devices 254, 256. The cache only virtual devices 254, 256 corresponded device tables that may be stored, for example, in the memory 38 of the remote storage device 26. Each track entry of the tables of each of the cache only virtual devices 254, 256 point to either a track of the standard logical device 252 or point to a slot of the cache 242. Cache only virtual devices are described in a copending U.S. patent application titled CACHE-ONLY VIRTUAL DEVICES, U.S. patent application Ser. No. 10/396,800 filed on Mar. 25, 2003, which is incorporated by reference herein.

The plurality of cache slots 244-246 may be used in connection to writes to the standard logical device 252 and, at the same time, used in connection with the cache only virtual devices 254, 256. In an embodiment herein, each of track table entry of the cache only virtual devices 254, 256 contain a null to indicate that the data for that track is stored on a corresponding track of the standard logical device 252. Otherwise, an entry in the track table for each of the cache only virtual devices 254, 256 contains a pointer to one of the slots 244-246 in the cache 242.

Each of the cache only virtual devices 254, 256 corresponds to one of the data chunks 56, 58. Thus, for example, the cache only virtual device 254 may correspond to the data chunk 56 while the cache only virtual device 256 may correspond to the data chunk 58. In an embodiment herein, one of the cache only virtual devices 254, 256 may be deemed "active" while the other one of the cache only virtual devices 254, 256 may be deemed "inactive". The inactive one of the cache only virtual devices 254, 256 may correspond to data being received from the local storage device 24 (i.e., the chunk 56) while the active one of the cache only virtual device 254, 256 corresponds to data being restored (written) to the standard logical device 252.

Data from the local storage device 24 that is received via the link 29 may be placed in one of the slots 244-246 of the cache 252. A corresponding pointer of the inactive one of the cache only virtual devices 254, 256 may be set to point to the received data. Subsequent data having the same sequence number may be processed in a similar manner. At some point, the remote storage device 24 provides a message committing all of the data sent using the same sequence number. Once the data for a particular sequence number has been committed, the inactive one of the cache only virtual devices 254, 256 becomes active and vice versa. At that point, data from the now active one of the cache only virtual devices 254, 256 is copied to the standard logical device 252 while the inactive one of the cache only virtual devices 254, 256 is used to receive new data (having a new sequence number) transmitted from the local storage device 24 to the remote storage device 26.

As data is removed from the inactive one of the cache only virtual devices 252, 254 (discussed elsewhere herein), the corresponding entry in the inactive one of the cache only virtual devices 252, 254 may be set to null. In addition, the data may also be removed from the cache 244 (i.e., the slot returned to the pool of free slots for later use) provided that the data in the slot is not otherwise needed for another purpose (e.g., to be destaged to the standard logical device 252). A mechanism may be used to ensure that data is not removed from the cache 242 until all mirrors (including the cache only virtual devices 254, 256) are no longer using the data. Such a mechanism is described, for example, in U.S. Pat. No. 5,537,568 issued on Jul. 16, 1996 and in U.S. patent application Ser. No. 09/850,551 filed on Jul. 7, 2001, both of which are incorporated by reference herein.

In some embodiments discussed elsewhere herein, the remote storage device 26 may maintain linked lists 258, 262 like the lists 74, 76 used by the local storage device 24. The lists 258, 262 may contain information that identifies the slots of the corresponding cache only virtual devices 254, 256 that have been modified, where one of the lists 258, 262 corresponds to one of the cache only virtual devices 254, 256 and the other one of the lists 258, 262 corresponds to the other one of the cache only virtual devices 254, 256. As discussed elsewhere herein, the lists 258, 262 may be used to facilitate restoring data from the cache only virtual devices 254, 256 to the standard logical device 252.

Figure 8:
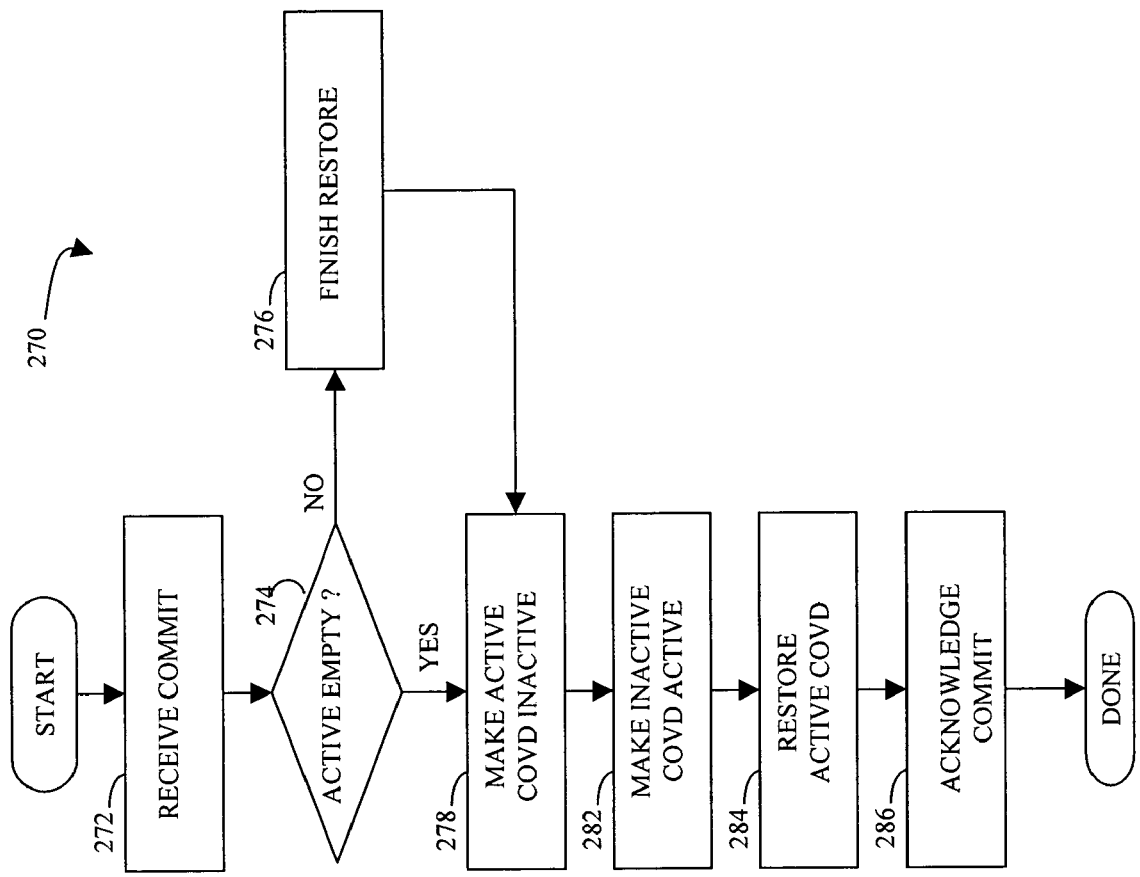
FIG. 8 is a flow chart illustrating steps performed by a remote storage device in connection with receiving a commit indicator from a local storage device according to the system described herein.

Referring to FIG. 8, a flow chart 270 illustrates steps performed by the remote storage device 26 in connection with processing data for a sequence number commit transmitted by the local storage device 24 to the remote storage device 26. As discussed elsewhere herein, the local storage device 24 periodically increments sequence numbers. When this occurs, the local storage device 24 finishes transmitting all of the data for the previous sequence number and then sends a commit message for the previous sequence number.

Processing begins at a first step 272 where the commit is received. Following the step 272 is a test step 274 which determines if the active one of the cache only virtual devices 254, 256 of the remote storage device 26 is empty. As discussed elsewhere herein, the inactive one of the cache only virtual devices 254, 256 of the remote storage device 26 is used to accumulate data from the local storage device 24 sent using RDF while the active one of the cache only virtual devices 254, 256 is restored to the standard logical device 252.

If it is determined at the test step 274 that the active one of the cache only virtual devices 254, 256 is not empty, then control transfers from the test step 274 to a step 276 where the restore for the active one of the cache only virtual devices 254, 256 is completed prior to further processing being performed. Restoring data from the active one of the cache only virtual devices 254, 256 is described in more detail elsewhere herein. It is useful that the active one of the cache only virtual devices 254, 256 is empty prior to handling the commit and beginning to restore data for the next sequence number.

Following the step 276 or following the step 274 is the active one of the cache only virtual devices 254, 256 is determined to be empty, is a step 278 where the active one of the cache only virtual devices 254, 256 is made inactive. Following the step 278 is a step 282 where the previously inactive one of the cache only virtual devices 254, 256 (i.e., the one that was inactive prior to execution of the step 278) is made active. Swapping the active and inactive cache only virtual devices 254, 256 at the steps 278, 282 prepares the now inactive (and empty) one of the cache only virtual devices 254, 256 to begin to receive data from the local storage device 24 for the next sequence number.

Following the step 282 is a step 284 where the active one of the cache only virtual devices 254, 256 is restored to the standard logical device 252 of the remote storage device 26. Restoring the active one of the cache only virtual devices 254, 256 to the standard logical device 252 is described in more detail hereinafter. However, note that, in some embodiments, the restore process is begun, but not necessarily completed, at the step 284. Following the step 284 is a step 286 where the commit that was sent from the local storage device 24 to the remote storage device 26 is acknowledged back to the local storage device 24 so that the local storage device 24 is informed that the commit was successful. Following the step 286, processing is complete.

Figure 9:
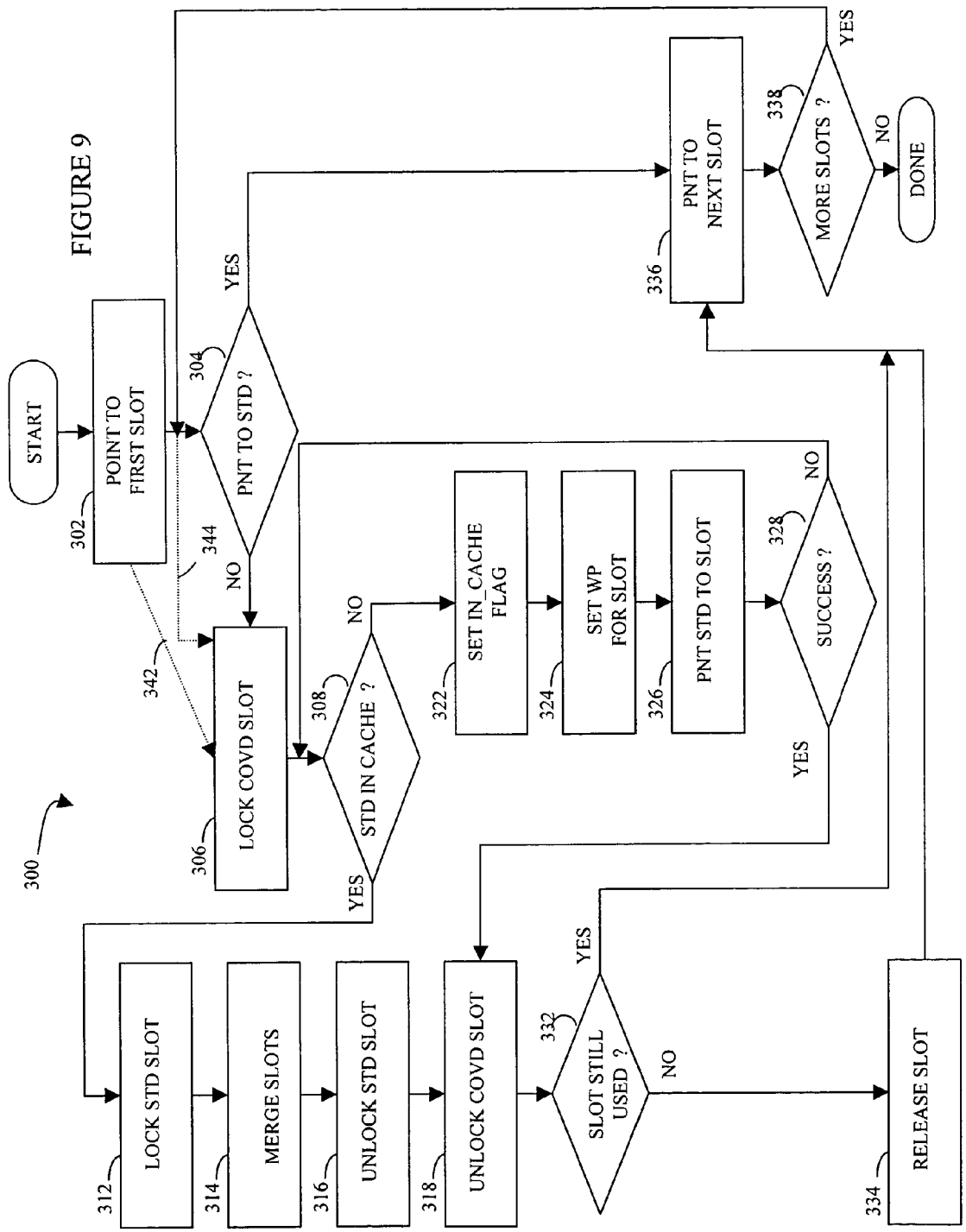
FIG. 9 is a flow chart illustrating storing transmitted data at a remote storage device according to the system described herein.

Referring to FIG. 9, a flow chart 300 illustrates in more detail the steps 276, 284 of FIG. 8 where the remote storage device 26 restores the active one of the cache only virtual devices 254, 256. Processing begins at a first step 302 where a pointer is set to point to the first slot of the active one of the cache only virtual devices 254, 256. The pointer is used to iterate through each track table entry of the active one of the cache only virtual devices 254, 256, each of which is processed individually. Following the step 302 is a test step 304 where it is determined if the track of the active one of the cache only virtual devices 254, 256 that is being processed points to the standard logical device 252. If so, then there is nothing to restore. Otherwise, control transfers from the step 304 to a step a 306 where the corresponding slot of the active one of the cache only virtual devices 254, 256 is locked.

Following the step 306 is a test step 308 which determines if the corresponding slot of the standard logical device 252 is already in the cache of the remote storage device 26. If so, then control transfers from the test step 308 to a step 312 where the slot of the standard logical device is locked. Following step 312 is a step 314 where the data from the active one of the cache only virtual devices 254, 256 is merged with the data in the cache for the standard logical device 252. Merging the data at the step 314 involves overwriting the data for the standard logical device with the new data of the active one of the cache only virtual devices 254, 256. Note that, in embodiments that provide for record level flags, it may be possible to simply OR the new records from the active one of the cache only virtual devices 254, 256 to the records of the standard logical device 252 in the cache. That is, if the records are interleaved, then it is only necessary to use the records from the active one of the cache only virtual devices 254, 256 that have changed and provide the records to the cache slot of the standard logical device 252. Following step 314 is a step 316 where the slot of the standard logical device 252 is unlocked. Following step 316 is a step 318 where the slot of the active one of the cache only virtual devices 254, 256 that is being processed is also unlocked.

If it is determined at the test step 308 that the corresponding slot of the standard logical device 252 is not in cache, then control transfers from the test step 308 to a step 322 where the track entry for the slot of the standard logical device 252 is changed to indicate that the slot of the standard logical device 252 is in cache (e.g., an IN_CACHE flag may be set) and needs to be destaged. As discussed elsewhere herein, in some embodiments, only records of the track having appropriate mirror bits set may need to be destaged. Following the step 322 is a step 324 where a flag for the track may be set to indicate that the data for the track is in the cache.

Following the step 324 is a step 326 where the slot pointer for the standard logical device 252 is changed to point to the slot in the cache. Following the step 326 is a test step 328 which determines if the operations performed at the steps 322, 324, 326 have been successful. In some instances, a single operation called a "compare and swap" operation may be used to perform the steps 322, 324, 326. If these operations are not successful for any reason, then control transfers from the step 328 back to the step 308 to reexamine if the corresponding track of the standard logical device 252 is in the cache. Otherwise, if it is determined that the test step 328 that the previous operations have been successful, then control transfers from the test step 328 to the step 318, discussed above.

Following the step 318 is a test step 332 which determines if the cache slot of the active one of the cache only virtual devices 254, 256 (which is being restored) is still being used. In some cases, it is possible that the slot for the active one of the cache only virtual devices 254, 256 is still being used by another mirror. In other embodiments, the test at the step 332 is not necessary because the COVD slots are not used for anything else. If it is determined at the test step 332 that the slot of the cache only virtual device is not being used by another mirror, then control transfers from the test step 332 to a step 334 where the slot is released for use by other processes (e.g., restored to pool of available slots, as discussed elsewhere herein). Following the step 334 is a step 336 to point to the next slot to process the next slot of the active one of the cache only virtual devices 254, 256. Note that the step 336 is also reached from the test step 332 if it is determined at the step 332 that the active one of the cache only virtual devices 254, 256 is still being used by another mirror. Note also that the step 336 is reached from the test step 304 if it is determined at the step 304 that, for the slot being processed, the active one of the cache only virtual devices 254, 256 points to the standard logical device 252. Following the step 336 is a test step 338 which determines if there are more slots of the active one of the cache only virtual devices 254, 256 to be processed. If not, processing is complete. Otherwise, control transfers from the test step 338 back to the step 304.

In another embodiment, it is possible to construct lists of modified slots for the received chunk of data 56 corresponding to the N-1 cycle on the remote storage device 26, such as the lists 259, 262 shown in FIG. 7. As the data is received, the remote storage device 26 constructs a linked list of modified slots. The lists that are constructed may be circular, linear (with a NULL termination), or any other appropriate design. The lists may then be used to restore the active one of the cache only virtual devices 254, 256.

The flow chart 300 of FIG. 9 shows two alternative paths 342, 344 that illustrate operation of embodiments where a list of modified slots is used. At the step 302, a pointer (used for iterating through the list of modified slots) is made to point to the first element of the list. Following the step 302 is the step 306, which is reached by the alternative path 342. In embodiments that use lists of modified slots, the test step 304 is not needed since no slots on the list should point to the standard logical device 252.

Following the step 306, processing continues as discussed above with the previous embodiment, except that the step 336 refers to traversing the list of modified slots rather that pointing to the next slot in the COVD. Similarly, the test at the step 338 determines if the pointer is at the end of the list (or back to the beginning in the case of a circular linked list). Also, if it is determined at the step 338 that there are more slots to process, then control transfers from the step 338 to the step 306, as illustrated by the alternative path 344. As discussed above, for embodiments that use a list of modified slots, the step 304 may be eliminated.

Figure 10:
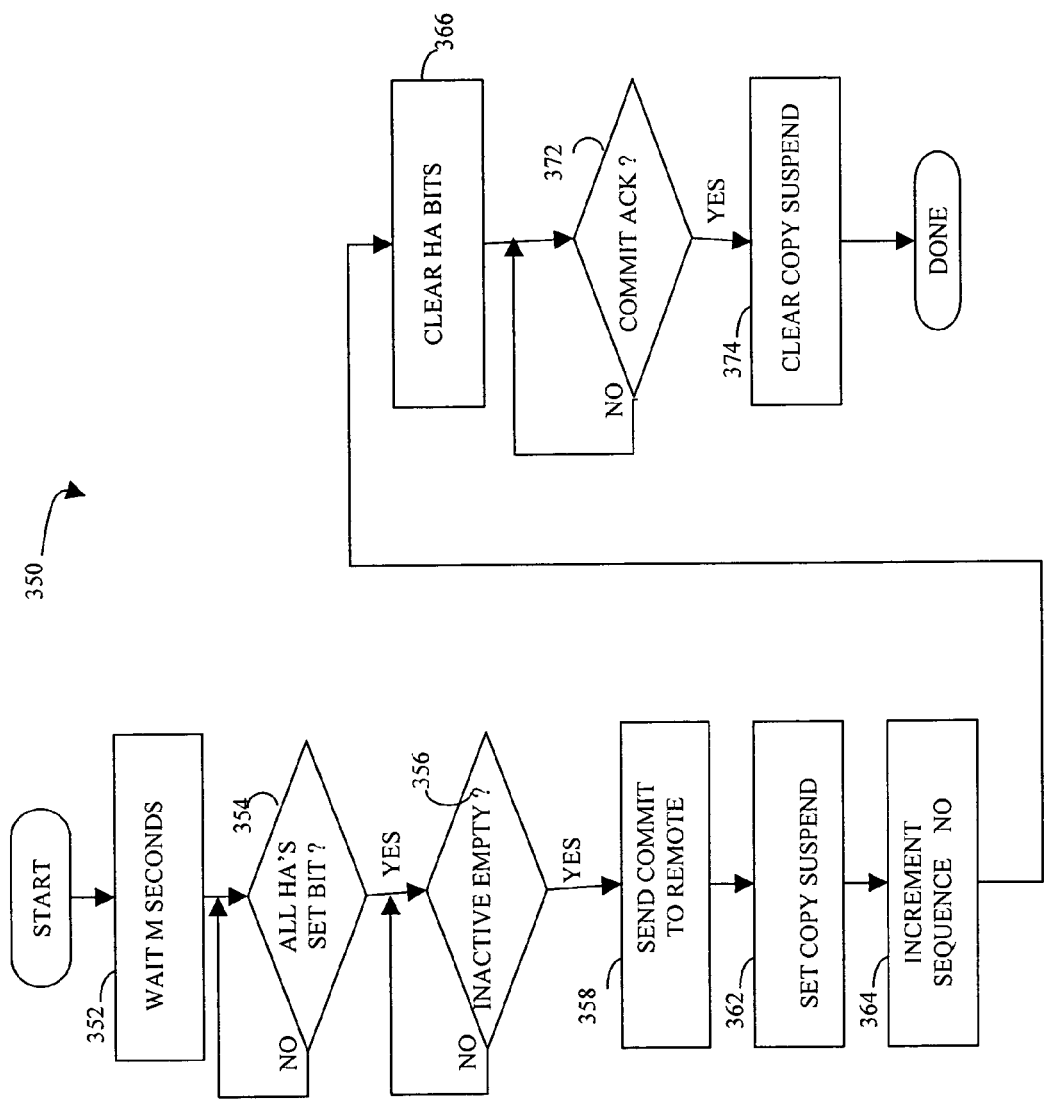
FIG. 10 is a flow chart illustrating steps performed in connection with a local storage device incrementing a sequence number according to a system described herein.

Referring to FIG. 10, a flow chart 350 illustrates steps performed in connection with the local storage device 24 increasing the sequence number. Processing begins at a first step 352 where the local storage device 24 waits at least M seconds prior to increasing the sequence number. In an embodiment herein, M is thirty, but of course M could be any number. Larger values for M increase the amount of data that may be lost if communication between the storage devices 24, 26 is disrupted. However, smaller values for M increase the total amount of overhead caused by incrementing the sequence number more frequently.

Following the step 352 is a test step 354 which determines if all of the HA's of the local storage device 24 have set a bit indicating that the HA's have completed all of the I/O's for a previous sequence number. When the sequence number changes, each of the HA's notices the change and sets a bit indicating that all I/O's of the previous sequence number are completed. For example, if the sequence number changes from N-1 to N, an HA will set the bit when the HA has completed all I/O's for sequence number N-1. Note that, in some instances, a single I/O for an HA may take a long time and may still be in progress even after the sequence number has changed. Note also that, for some systems, a different mechanism may be used to determine if all of the HA's have completed their N-1 I/O's. The different mechanism may include examining device tables in the memory 37.

If it is determined at the test step 354 that I/O's from the previous sequence number have been completed, then control transfers from the step 354 to a test step 356 which determines if the inactive one of the lists 74, 76 is empty. Note that a sequence number switch may not be made unless and until all of the data corresponding to the inactive one of the lists 74, 76 has been completely transmitted from the local storage device 24 to the remote storage device 26 using the RDF protocol. Once the inactive one of the lists 74, 76 is determined to be empty, then control transfers from the step 356 to a step 358 where the commit for the previous sequence number is sent from the local storage device 24 to the remote storage device 26. As discussed above, the remote storage device 26 receiving a commit message for a particular sequence number will cause the remote storage device 26 to begin restoring the data corresponding to the sequence number.

Following the step 358 is a step 362 where the copying of data for the inactive one of the lists 74, 76 is suspended. As discussed elsewhere herein, the inactive one of the lists is scanned to send corresponding data from the local storage device 24 to the remote storage device 26. It is useful to suspend copying data until the sequence number switch is completed. In an embodiment herein, the suspension is provided by sending a message to the RA's 30a-30c. However, it will be appreciated by one of ordinary skill in the art that for embodiments that use other components to facilitate sending data using the system described herein, suspending copying may be provided by sending appropriate messages/commands to the other components.

Following step 362 is a step 364 where the sequence number is incremented. Following step 364 is a step 366 where the bits for the HA's that are used in the test step 354 are all cleared so that the bits may be set again in connection with the increment of the sequence number. Following step 366 is a test step 372 which determines if the remote storage device 26 has acknowledged the commit message sent at the step 358. Acknowledging the commit message is discussed above in connection with FIG. 8. Once it is determined that the remote storage device 26 has acknowledged the commit message sent at the step 358, control transfers from the step 372 to a step 374 where the suspension of copying, which was provided at the step 362, is cleared so that copying may resume. Following step 374, processing is complete. Note that it is possible to go from the step 374 back to the step 352 to begin a new cycle to continuously increment the sequence number.

It is also possible to use COVD's on the R1 device to collect slots associated with active data and inactive chunks of data. In that case, just as with the R2 device, one COVD could be associated with the inactive sequence number and another COVD could be associated with the active sequence number. This is described below.

Figure 11:
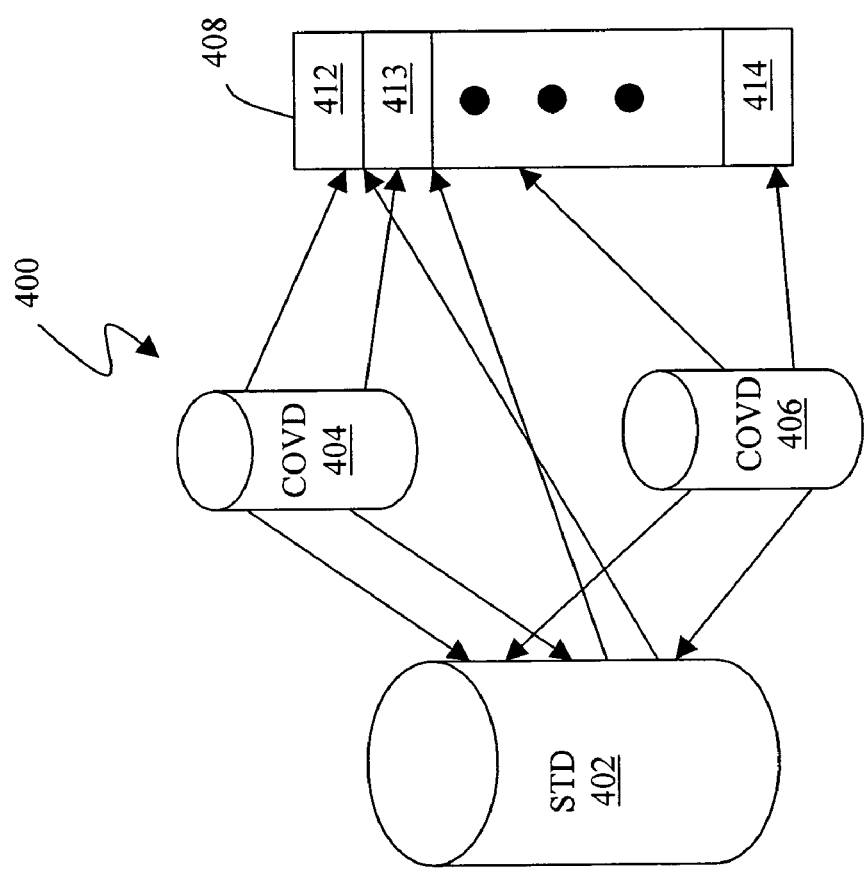
FIG. 11 is a schematic diagram illustrating items for constructing and manipulating chunks of data on a local storage device according to an alternative embodiment of the system described herein.

Referring to FIG. 11, a diagram 400 illustrates items used to construct and maintain the chunks 52, 54. A standard logical device 402 contains data written by the host 22 and corresponds to the data element 51 of FIG. 2 and the disks 33a-33c of FIG. 1. The standard logical device 402 contains data written by the host 22 to the local storage device 24.

Two cache only virtual devices 404, 406 are used in connection with the standard logical device 402. The cache only virtual devices 404, 406 corresponded device tables that may be stored, for example, in the memory 37 of the local storage device 24. Each track entry of the tables of each of the cache only virtual devices 404, 406 point to either a track of the standard logical device 402 or point to a slot of a cache 408 used in connection with the local storage device 24. In some embodiments, the cache 408 may be provided in the memory 37 of the local storage device 24.

The cache 408 contains a plurality of cache slots 412-414 that may be used in connection to writes to the standard logical device 402 and, at the same time, used in connection with the cache only virtual devices 404, 406. In an embodiment herein, each track table entry of the cache only virtual devices 404, 406 contains a null to point to a corresponding track of the standard logical device 402. Otherwise, an entry in the track table for each of the cache only virtual devices 404, 406 contains a pointer to one of the slots 412-414 in the cache 408.

Each of the cache only virtual devices 404, 406 may be used for one of the chunks of data 52, 54 so that, for example, the cache only virtual device 404 may correspond to the chunk of data 52 for sequence number N while the cache only virtual device 406 may correspond to the chunk of data 54 for sequence number N-1. Thus, when data is written by the host 22 to the local storage device 24, the data is provided to the cache 408 and an appropriate pointer of the cache only virtual device 404 is adjusted. Note that the data will not be removed from the cache 408 until the data is destaged to the standard logical device 402 and the data is also released by the cache only virtual device 404, as described elsewhere herein.

In an embodiment herein, one of the cache only virtual devices 404, 406 is deemed "active" while the other is deemed "inactive". Thus, for example, when the sequence number N is even, the cache only virtual device 404 may be active while the cache only virtual device 406 is inactive. The active one of the cache only virtual devices 404, 406 handles writes from the host 22 while the inactive one of the cache only virtual devices 404, 406 corresponds to the data that is being transmitted from the local storage device 24 to the remote storage device 26.

While the data that is written by the host 22 is accumulated using the active one of the cache only virtual devices 404, 406 (for the sequence number N), the data corresponding to the inactive one of the cache only virtual devices 404, 406 (for previous sequence number N-1) is transmitted from the local storage device 24 to the remote storage device 26. For this and related embodiments, the DA's 35a-35c of the local storage device handle scanning the inactive one of the cache only virtual devices 404, 406 to send copy requests to one or more of the RA's 30a-30c to transmit the data from the local storage device 24 to the remote storage device 26. Thus, the steps 362, 374, discussed above in connection with suspending and resuming copying, may include providing messages/commands to the DA's 35a-35c.

Once the data has been transmitted to the remote storage device 26, the corresponding entry in the inactive one of the cache only virtual devices 404, 406 may be set to null. In addition, the data may also be removed from the cache 408 (i.e., the slot returned to the pool of slots for later use) if the data in the slot is not otherwise needed for another purpose (e.g., to be destaged to the standard logical device 402). A mechanism may be used to ensure that data is not removed from the cache 408 until all mirrors (including the cache only virtual devices 404, 406) are no longer using the data. Such a mechanism is described, for example, in U.S. Pat. No. 5,537,568 issued on Jul. 16, 1996 and in U.S. patent application Ser. No. 09/850,551 filed on Jul. 7, 2001, both of which are incorporated by reference herein.

Figure 12:
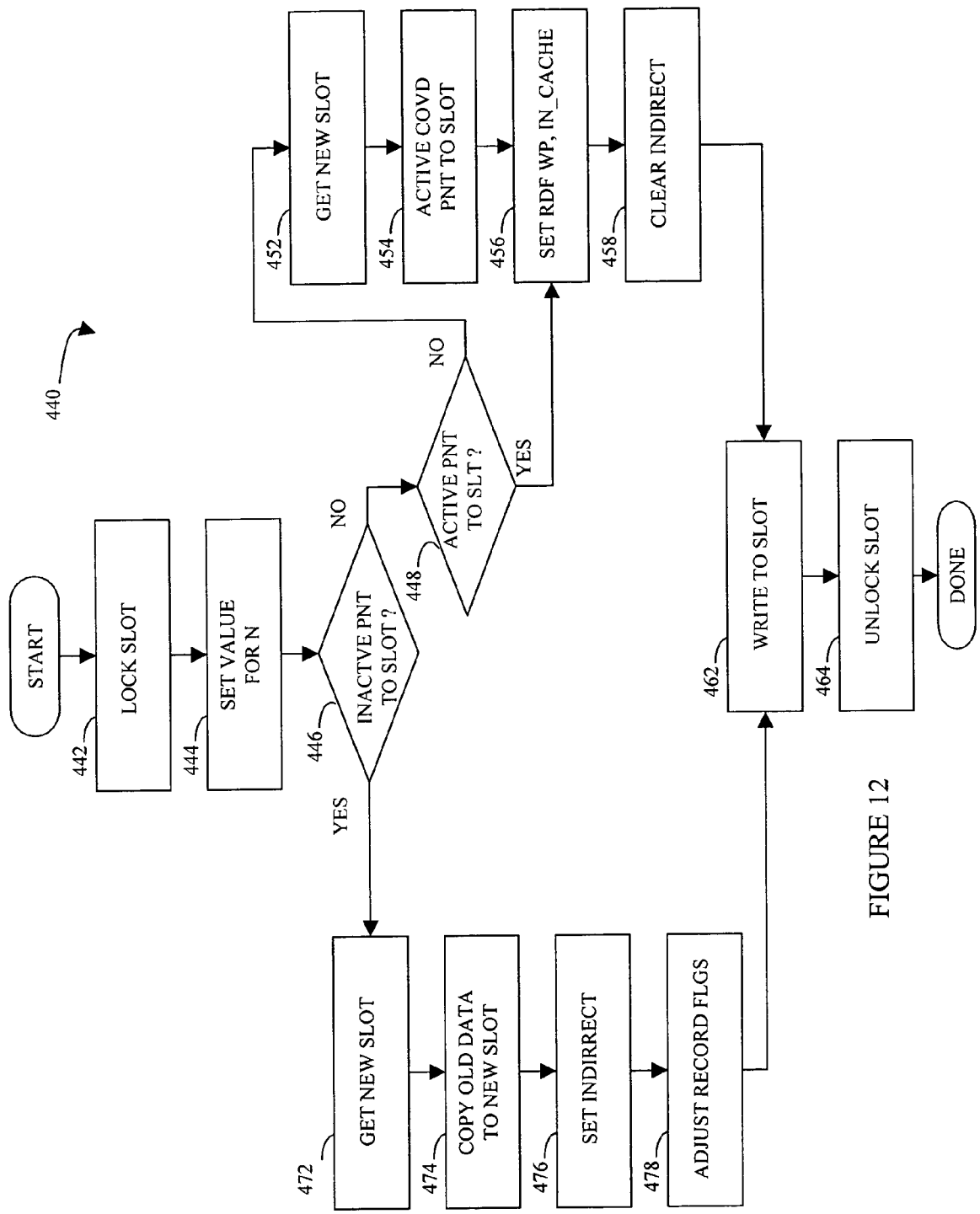
FIG. 12 is a flow chart illustrating operation of a host adaptor (HA) in response to a write by a host according to an alternative embodiment of the system described herein.

Referring to FIG. 12, a flow chart 440 illustrates steps performed by the HA 28 in connection with a host 22 performing a write operation for embodiments where two COVD's are used by the R1 device to provide the system described herein. Processing begins at a first step 442 where a slot corresponding to the write is locked. In an embodiment herein, each of the slots 412-414 of the cache 408 corresponds to a track of data on the standard logical device 402. Locking the slot at the step 442 prevents additional processes from operating on the relevant slot during the processing performed by the HA 28 corresponding to the steps of the flow chart 440.

Following the step 442 is a step 444 where a value for N, the sequence number, is set. Just as with the embodiment that uses lists rather than COVD's on the R1 side, the value for the sequence number obtained at the step 444 is maintained during the entire write operation performed by the HA 28 while the slot is locked. As discussed elsewhere herein, the sequence number is assigned to each write to set the one of the chunks of data 52, 54 to which the write belongs. Writes performed by the host 22 are assigned the current sequence number. It is useful that a single write operation maintain the same sequence number throughout.

Following the step 444 is a test step 446, which determines if the inactive one of the cache only virtual devices 404, 406 already points to the slot that was locked at the step 442 (the slot being operated upon). This may occur if a write to the same slot was provided when the sequence number was one less than the current sequence number. The data corresponding to the write for the previous sequence number may not yet have been transmitted to the remote storage device 26.

If it is determined at the test step 446 that the inactive one of the cache only virtual devices 404, 406 does not point to the slot, then control transfers from the test step 446 to another test step 448, where it is determined if the active one of the cache only virtual devices 404, 406 points to the slot. It is possible for the active one of the cache only virtual devices 404, 406 to point to the slot if there had been a previous write to the slot while the sequence number was the same as the current sequence number. If it is determined at the test step 448 that the active one of the cache only virtual devices 404, 406 does not point to the slot, then control transfers from the test step 448 to a step 452 where a new slot is obtained for the data. Following the step 452 is a step 454 where the active one of the cache only virtual devices 404, 406 is made to point to the slot.

Following the step 454, or following the step 448 if the active one of the cache only virtual devices 404, 406 points to the slot, is a step 456 where flags are set. At the step 456, the RDF_WP flag (RDF write pending flag) is set to indicate that the slot needs to be transmitted to the remote storage device 26 using RDF. In addition, at the step 456, the IN_CACHE flag is set to indicate that the slot needs to be destaged to the standard logical device 402. Note that, in some instances, if the active one of the cache only virtual devices 404, 406 already points to the slot (as determined at the step 448) it is possible that the RDF_WP and IN_CACHE flags were already set prior to execution of the step 456. However, setting the flags at the step 456 ensures that the flags are set properly no matter what the previous state.

Following the step 456 is a step 458 where an indirect flag in the track table that points to the slot is cleared, indicating that the relevant data is provided in the slot and not in a different slot indirectly pointed to. Following the step 458 is a step 462 where the data being written by the host 22 and the HA 28 is written to the slot. Following the step 462 is a step 464 where the slot is unlocked. Following step 464, processing is complete.

If it is determined at the test step 446 that the inactive one of the cache only virtual devices 404, 406 points to the slot, then control transfers from the step 446 to a step 472, where a new slot is obtained. The new slot obtained at the step 472 may be used for the inactive one of the cache only virtual devices 404, 406 to effect the RDF transfer while the old slot may be associated with the active one of the cache only virtual devices 404, 406, as described below.

Following the step 472 is a step 474 where the data from the old slot is copied to the new slot that was obtained at the step 472. Following the step 474 is a step 476 where the indirect flag (discussed above) is set to indicate that the track table entry for the inactive one of the cache only virtual devices 404, 406 points to the old slot but that the data is in the new slot which is pointed to by the old slot. Thus, setting indirect flag at the step 476 affects the track table of the inactive one of the cache only virtual devices 404, 406 to cause the track table entry to indicate that the data is in the new slot.

Following the step 476 is a step 478 where the mirror bits for the records in the new slot are adjusted. Any local mirror bits that were copied when the data was copied from the old slot to the new slot at the step 474 are cleared since the purpose of the new slot is to simply effect the RDF transfer for the inactive one of the cache only virtual devices. The old slot will be used to handle any local mirrors. Following the step 478 is the step 462 where the data is written to the slot. Following step 462 is the step 464 where the slot is unlocked. Following the step 464, processing is complete.

Figure 13:
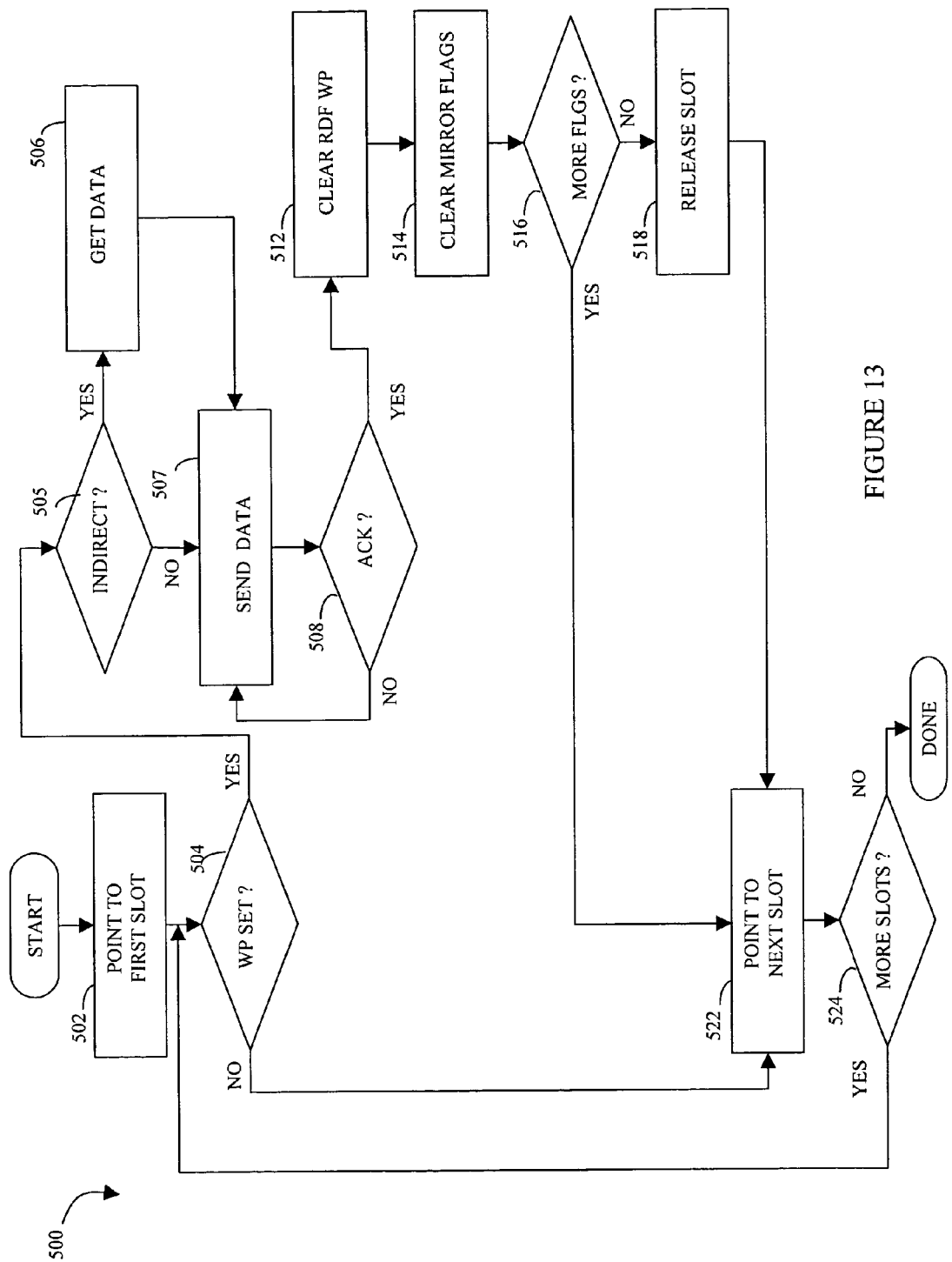
FIG. 13 is a flow chart illustrating transferring data from a local storage device to a remote storage device according to an alternative embodiment of the system described herein.

Referring to FIG. 13, a flow chart 500 illustrates steps performed in connection with the local storage device 24 transmitting the chunk of data 54 to the remote storage device 26. The transmission essentially involves scanning the inactive one of the cache only virtual devices 404, 406 for tracks that have been written thereto during a previous iteration when the inactive one of the cache only virtual devices 404, 406 was active. In this embodiment, the DA's 35a-35c of the local storage device 24 scan the inactive one of the cache only virtual devices 404, 406 to copy the data for transmission to the remote storage device 26 by one or more of the RA's 30a-30c using the RDF protocol.

Processing begins at a first step 502 where the first track of the inactive one of the cache only virtual devices 404, 406 is pointed to in order to begin the process of iterating through all of the tracks. Following the first step 502 is a test step 504 where it is determined if the RDF_WP flag is set. As discussed elsewhere herein, the RDF_WP flag is used to indicate that a slot (track) contains data that needs to be transmitted via the RDF link. The RDF_WP flag being set indicates that at least some data for the slot (track) is to be transmitted using RDF. In an embodiment herein, the entire slot is not transmitted. Rather, only records within the slot that have the appropriate mirror bits set (indicating the records have changed) are transmitted to the remote storage device 26. However, in other embodiments, it may be possible to transmit the entire slot, provided that the remote storage device 26 only writes data corresponding to records having appropriate mirror bits set and ignores other data for the track, which may or may not be valid.

If it is determined that the test step 504 that the cache slot being processed has the RDF_WP flag set, then control transfers from the step 504 to a test step 505, where it is determined if the slot contains the data or if the slot is an indirect slot that points to another slot that contains the relevant data. In some instances, a slot may not contain the data for the portion of the disk that corresponds to the slot. Instead, the slot may be an indirect slot that points to another slot that contains the data. If it is determined at the step 505 that the slot is an indirect slot, then control transfers from the step 505 to a step 506, where the data (from the slot pointed to by the indirect slot) is obtained. Thus, if the slot is a direct slot, the data for being sent by RDF is stored in the slot while if the slot is an indirect slot, the data for being sent by RDF is in another slot pointed to by the indirect slot.

Following the step 506 or the step 505 if the slot is a direct slot is a step 507 where data being sent (directly or indirectly from the slot) is copied by one of the DA's 35a-35c to be sent from the local storage device 24 to the remote storage device 26 using the RDF protocol. Following the step 507 is a test step 508 where it is determined if the remote storage device 26 has acknowledged receipt of the data. If not, then control transfers from the step 508 back to the step 507 to resend the data. In other embodiments, different and more involved processing may used to send data and acknowledge receipt thereof. Such processing may include error reporting and alternative processing that is performed after a certain number of attempts to send the data have failed.

Once it is determined at the test step 508 that the data has been successfully sent, control passes from the step 508 to a step 512 to clear the RDF_WP flag (since the data has been successfully sent via RDF). Following the step 512 is a step 514 where appropriate mirror flags are cleared to indicate that at least the RDF mirror (R2) no longer needs the data. In an embodiment herein, each record that is part of a slot (track) has individual mirror flags indicating which mirrors use the particular record. The R2 device is one of the mirrors for each of the records and it is the flags corresponding to the R2 device that are cleared at the step 514.

Following the step 514 is a test step 516 which determines if any of the records of the track being processed have any other mirror flags set (for other mirror devices). If not, then control passes from the step 516 to a step 518 where the slot is released (i.e., no longer being used). In some embodiments, unused slots are maintained in pool of slots available for use. Note that if additional flags are still set for some of the records of the slot, it may mean that the records need to be destaged to the standard logical device 402 or are being used by some other mirror (including another R2 device). Following the step 518, or following the step 516 if more mirror flags are present, is a step 522 where the pointer that is used to iterate through each track entry of the inactive one of the cache only virtual devices 404, 406 is made to point to the next track. Following the step 522 is a test step 524 which determines if there are more tracks of the inactive one of the cache only virtual devices 404, 406 to be processed. If not, then processing is complete. Otherwise, control transfers back to the test step 504, discussed above. Note that the step 522 is also reached from the test step 504 if it is determined that the RDF_WP flag is not set for the track being processed.

In some instances, it may be useful to be able to read data from an R2 device using a host coupled to a local storage device while the system is operating and performing virtual ordered writes from the local storage device (R1) to a remote storage device. In connection with this, it is useful for the host coupled to the local storage device to be able to read the most up-to-date data that is consistent (i.e., part of a committed chunk of data on the R2 side).

Figure 14:
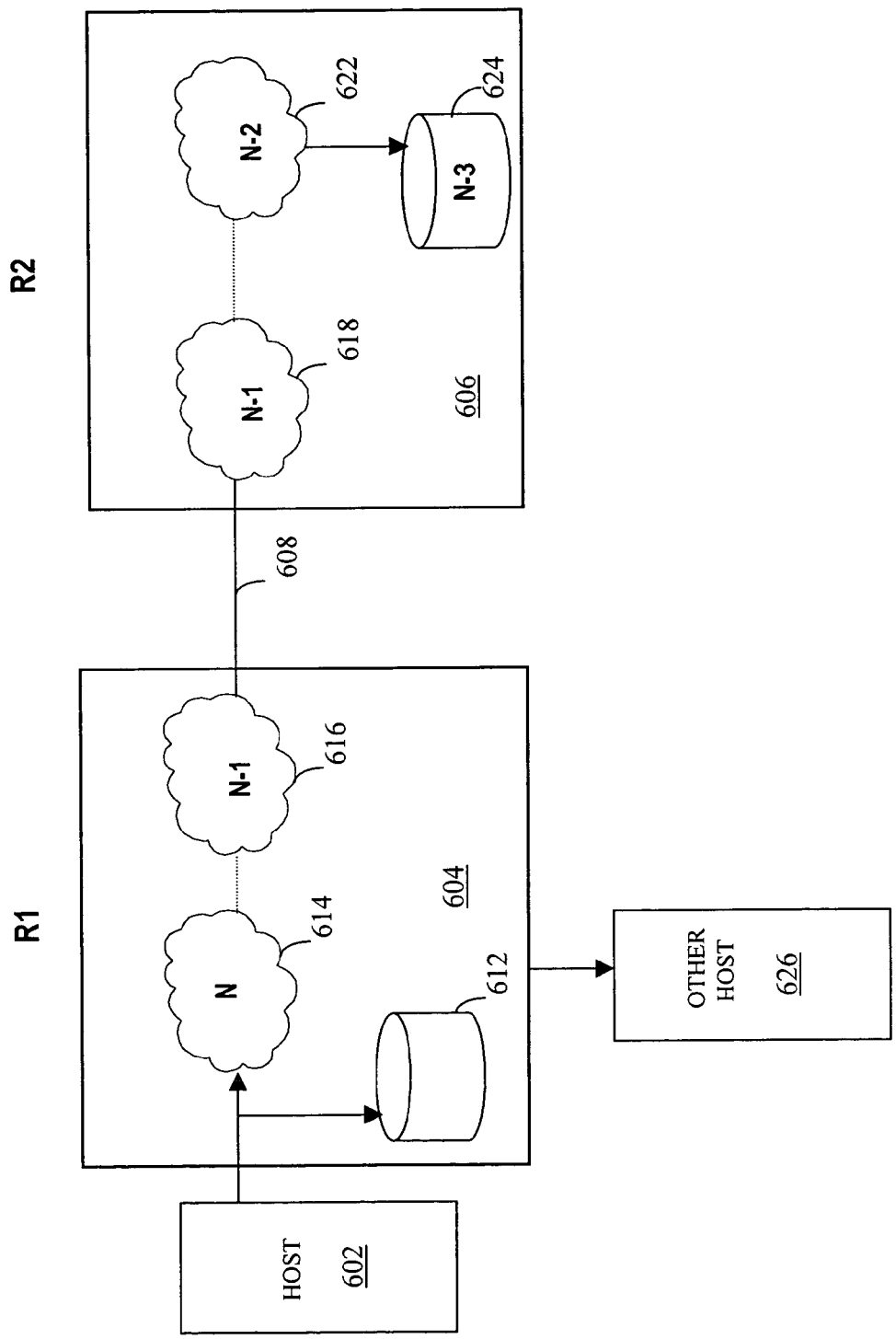
FIG. 14 is a schematic diagram showing a flow of data between a first host, a local storage device, a remote data storage device, and another host coupled to the local storage device used in connection with the system described herein.

FIG. 14 illustrates a path of data from a host 602 to a local storage device 604 and a remote storage device 606 via a link 608. The system of FIG. 14 is similar to the system illustrated in FIG. 2 and discussed above. Data written from the host 602 to the local storage device 604 is stored locally, as illustrated by the data element 612 of the local storage device 604. The data that is written by the host 602 to the local storage device 604 is also maintained by the local storage device 604 in connection with being sent by the local storage device 604 to the remote storage device 606 via the link 608.

Each data write by the host 602 (of, for example a record, a plurality of records, a track, etc.) is assigned a sequence number. The sequence number may be provided in an appropriate data field associated with the write. In FIG. 14, the writes by the host 602 are shown as being assigned sequence number N. All of the writes performed by the host 602 that are assigned sequence number N are collected in a single chunk of data 614. The chunk 614 represents a plurality of separate writes by the host 602 that occur at approximately the same time.

Generally, the local storage device 604 accumulates chunks of one sequence number while transmitting a previously accumulated chunk (having the previous sequence number) to the remote storage device 606. Thus, while the local storage device 604 is accumulating writes from the host 602 that are assigned sequence number N, the writes that occurred for the previous sequence number (N-1) are transmitted by the local storage device 604 to the remote storage device 606 via the link 608. A chunk 616 represents writes from the host 602 that were assigned the sequence number N-1 that have not been transmitted yet to the remote storage device 606.

The remote storage device 606 receives the data from the chunk 616 corresponding to writes assigned a sequence number N-1 and constructs a new chunk 618 of host writes having sequence number N-1. The data may be transmitted using appropriate RDF protocol that acknowledges data sent across the link 608. When the remote storage device 606 has received all of the data from the chunk 616, the local storage device 604 sends a commit message to the remote storage device 606 to commit all the data assigned the N-1 sequence number corresponding to the chunk 618. Generally, once a chunk corresponding to a particular sequence number is committed, that chunk may be written to the logical storage device. This is illustrated in FIG. 14 with a chunk 622 corresponding to writes assigned sequence number N-2 (i.e., two before the current sequence number being used in connection with writes by the host 602 to the local storage device 606).

In FIG. 14, the chunk 622 is shown as being written to a data element 624 representing disk storage (standard logical device) for the remote storage device 606. Thus, the remote storage device 606 is receiving and accumulating the chunk 618 corresponding to sequence number N-1 while the chunk 622 corresponding to the previous sequence number (N-2) is being written to disk storage of the remote storage device 606 illustrated by the data element 624. In some embodiments, the data for the chunk 622 is marked for write (but not necessarily written immediately), while the data for the chunk 618 is not. Data stored on the data element 624 is shown as having sequence number N-3, this indicating the data on the data element 624 may be one (or more) generations behind the committed data represented by the chunk 622.

Thus, in operation, the host 602 writes data to the local storage device 604 that is stored locally in the data element 612 and is accumulated in the chunk 614. Once all of the data for a particular sequence number has been accumulated (described elsewhere herein), the local storage device 604 increments the sequence number. Data from the chunk 616 corresponding to one less than the current sequence number is transferred from the local storage device 604 to the remote storage device 606 via the link 608. The chunk 622 corresponds to data for a sequence number that was committed by the local storage device 604 sending a message to the remote storage device 606. Data from the chunk 622 is written to disk storage of the remote storage device 264, which contains data from a previous generation corresponding to sequence number N-3.

It may be desirable for an other host 626, coupled to the local storage device 604, to read data from the remote storage device 606 that had been initially provided by the host 602 to the local storage device 604 and transmitted from the local storage device 604 via the link 608 to the remote storage device 606. It may also be desirable for the host 602 to read the data. For example, in some cases the R1 device may fail but it is desirable for one or both of the hosts 602, 626 to continue operating with the most up-to-date version of the data while maintaining consistency of the R2 side. Note that the desired data may have some components on the local disk unit 612, in the N chunk 614, in the N-1 chunks 616, 618. in the N-2 chunk 622, and on the disk unit 624 of the remote storage device 606. The description herein for reading the data applies to both the host 602 reading the data and/or the other host 626 reading the data.

Figure 15:
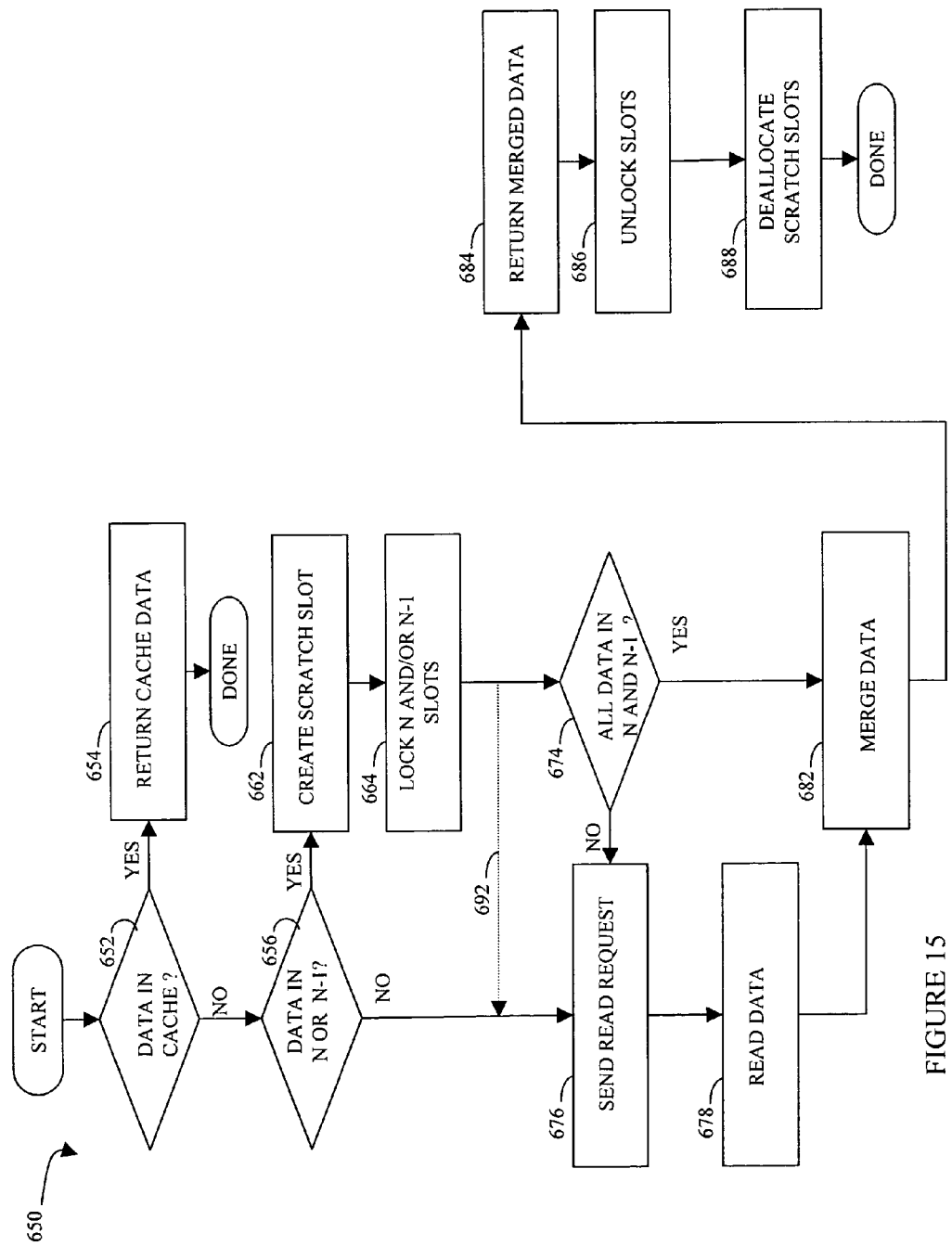
FIG. 15 is a flow chart illustrating steps performed in connection with a host coupled to a local storage device reading virtual ordered writes from a remote storage device according to the system described herein.

Referring to FIG. 15, a flow chart 650 illustrates steps performed in connection with either or both of the hosts 602, 626 reading data from the R2 device 606. Processing begins at a first step 652 where it is determined if the desired data (data being read) is in the cache of the R1 device. Note that if all of the desired data is in the cache of the R1 device 604, then it is not necessary to obtain any data from the R2 device 606. If it is determined at the step 652 that the data is in the cache of the R1 device, then control passes from the step 652 to a step 654 where the data in the cache of the R1 device 604 is returned in response to the read request. After the step 654, processing is complete.

If it is determined at the test step 652 that all of the requested data is not in the cache of the R1 device 604, then control passes from the step 652 to a test step 656 which determines if some of the data is in a slot for a track corresponding to either or both of the N chunk 614 and the N-1 chunk 616. If so, then control passes from the step 656 to a step 662 where a scratch slot is created for receiving data read from the R2 device (described below). Following the step 662 is a step 664 where the slots corresponding to either or both of the N and N-1 chunks 614, 616 are locked. Locking the slots at step 664 prevents the data from changing while the read process is being performed.

Following the step 664 is a test step 674 which determines if all of the desired data is in either or both of the N chunks 614, 616. If not, then control passes from the step 674 to a step 676 where the R1 device 604 sends a read request to the R2 device 606. Processing the read request at the R2 device 606 is discussed in more detail hereinafter. Following 676 is a step 678 where the data from the R2 device 606 is read by the R1 device 604. If a scratch slot was created at the step 662, the data from the R2 device 606 is read into the scratch slot. Otherwise, the data may be received directly to the R1 device 604.

Following step 678, or following the step 674 if all of the desired data is found to be in either or both of the N and N-1 chunks of data 614, 616 is a step 682 where the N chunk of data 614, the N-1 chunk of data 616 on the R1 device 604, and the data returned by the R2 device 606 is all merged. Note that the N-1 data (if any) is merged on top of any data in the scratch slot (which is older) and the result of that merger is merged on top of any N data, which is newest. Merging a first set of data on top of a second set of data means that the first set of data take precedence over the second set of data so that data from the first set overwrites corresponding data from the second set.

Merging the data at the step 682 is analogous to the merge step 314 of the flow chart 300 of FIG. 9. Note that it is possible for data from different parts of a track to be associated with different sequence numbers and to be on either the R1 device 604 and/or the R2 device 606. Accordingly, step 682 handles merging of all the data in all the cache slots to provide a single track's worth of data in the scratch slot.

Following step 682 is a step 684 where the merged data is returned to the host that issued the read command. Following step 684 is a step 686 where any of the slots that were locked during the read process are unlocked. Following step 686 is a step 688 where any scratch slots that were allocated during the read process are de-allocated. Following step 688, processing is complete.

In some embodiments, it is possible to forgo the test step 674 and always execute the step 676 after the step 664 or following the test step 656 if there is no data in either or both of the N and N-1 chunks 614, 616. This is illustrated in the flow chart 650 by the alternative path 692 from the step 664 to the step 676.

Figures 16A, 16B:
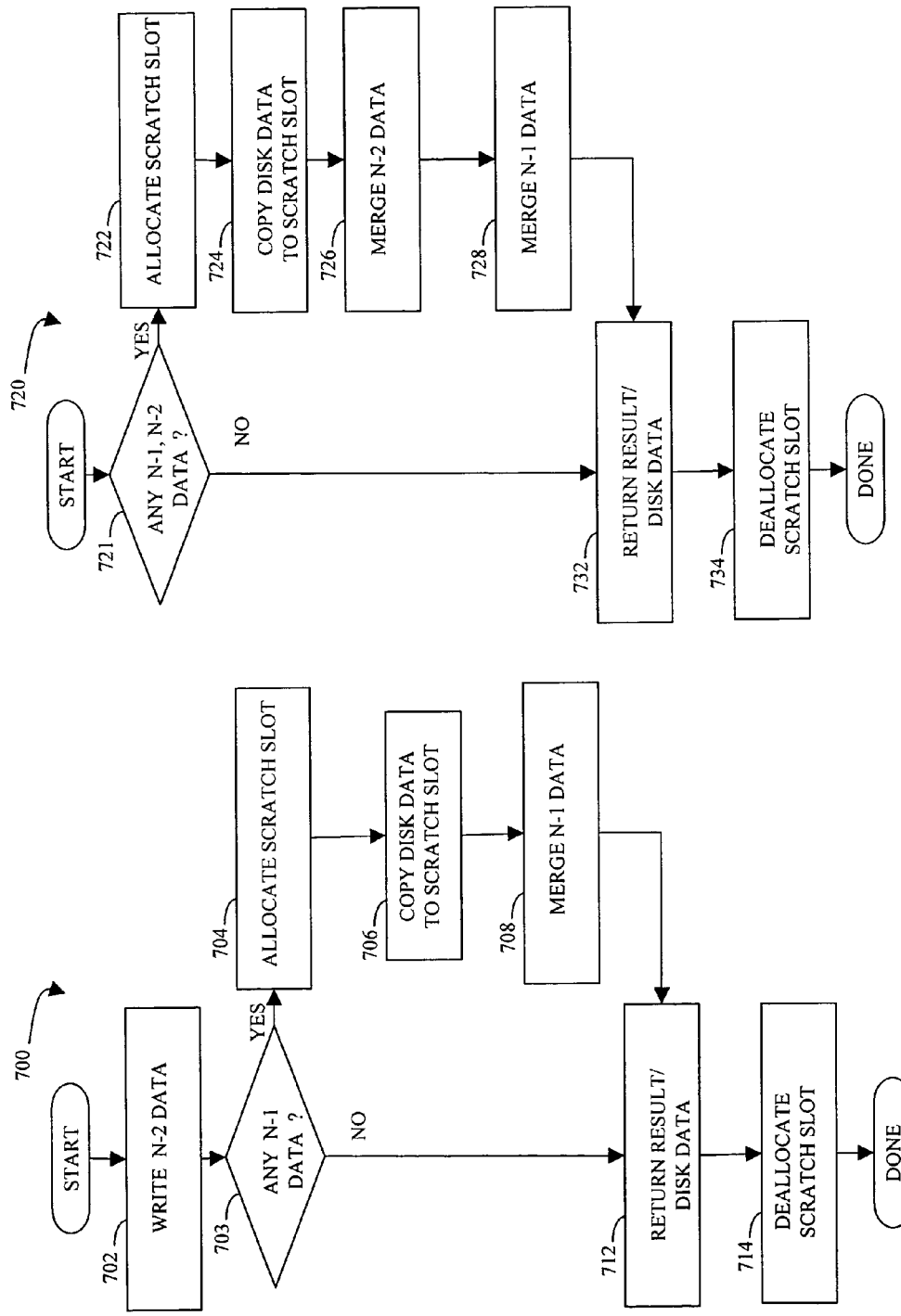
FIGS. 16A and 16B are flow charts illustrating steps performed by a remote storage device in response to a read request from a local storage device coupled to a host reading virtual ordered writes from a remote storage device according to the system described herein.

Referring to FIG. 16A, a flow chart 700 illustrates one embodiment for handling the read request at the R2 device 606 that is provided by the R1 device 604. Processing begins at a first step 702 where any data in the N-2 chunk of data 622 (which has already been committed) is restored to the disk unit 624. That is, if there is any data in the N-2 chunk of data 622 that is to be read, the data is restored to the disk unit 624 at the step 702.

Following step 702 is a step 703 where it is determined if there is any data in the N-1 chunk of data 618 that is to be read. If so, control passes from the step 703 to a step 704 where a scratch slot is allocated on the R2 device 606. Following step 704 is a step 706 where the data from the disk unit 624 is copied to the scratch slot allocated at the step 704. Following step 706 is a step 708 where the data in the scratch slot is merged with any corresponding data in the N-1 chunk of data 618 on the R2 device 606.

Following step 708 is a step 712 where the result of merging the data at the step 708 is returned to the R1 device 604. Note, however, that the step 712 may also be reached if it is determined at the step 703 that there is no data that is to be read in the N-1 chunk 618, in which case the data from the disk is returned at the step 712. Following step 712 is a step 714 where the slot allocated at the step 704 (if the step 704 is executed) is deallocated. Following step 714, processing is complete.

Referring to FIG. 16B, a flow chart 720 illustrates an alternative embodiment for handling the read request at the R2 device 606. Processing begins at a first step 721 where it is determined if there is any data in either or both of the N-1 and N-2 chunks of data 618, 622 that is to be read. If so, control passes from the step 721 to a step 722 where a scratch slot is allocated. Following step 722 is a step 724 where data from the disk unit 624 is copied to the scratch slot allocated at the step 722. Following step 724 is a step 726 where the data from the N-2 chunk of data 622 is merged with the data in the scratch slot. Following step 726 is a step 728 where the data from the N-1 chunk of data 618 on the R2 device 606 is merged with the scratch slot.

Following step 728 is a step 732 where the result of all the merging into the scratch slot is returned from the R2 device 606 to the R1 device 604. Note, however, that the step 732 may also be reached if it is determined at the step 721 that there is no data that is to be read in either or both of the N-1 and N-2 chunks 618, 622, in which case the data from the disk is returned at the step 732. Following step 732 is a step 734 where the scratch slot allocated at the step 722 (if the step 722 is executed) is deallocated. Following step 734, processing is complete.

While the invention has been disclosed in connection with various embodiments, modifications thereon will be readily apparent to those skilled in the art. Accordingly, the spirit and scope of the invention is set forth in the following claims.

What is claimed is:

1. A method of using a local storage device to read desired data while the data is being transferred from the local storage device to a remote storage device, the method comprising:
    if the desired data is entirely in a cache of the local storage device, the local storage device returning the data from the cache, wherein the cache of the local storage device contains data written to the local storage device begun after a first time and before a second time that is associated with a first chunk of data and contains data written to the local storage device begun after the second time that is associated with a second chunk of data different from the first chunk of data and wherein after completion of all writes associated with the first chunk of data, the local storage device initiates transfer of writes associated with the first chunk of data to the remote storage device, an order of the transfer from the local storage device to the remote storage device of data from the first chunk being independent of an order in which data writes of the first chunk are provided to the local storage device; and if the desired data is not entirely in the cache of the local storage device, reading data from the remote storage device to the local storage device and the local storage device merging the data from the remote storage device with data from the cache of the local storage device at the local storage;

prior to reading data from the remote storage device to the local storage device, creating a temporary storage area at the local storage device if there is data from the local storage device that is to be used;

prior to creating a temporary storage area, locking slots of the local storage device that correspond to data from the local storage device that is to be used;

after merging the data, unlocking the slots of the local storage device that correspond to data from the local storage device that is to be used.

2. A method, according to claim 1, wherein the temporary storage area is a scratch slot.

3. A method, according to claim 1, wherein the data from the local storage area is merged on top of data from the remote storage area.

4. A method, according to claim 1, further comprising:
the remote storage device allocating a temporary storage area in response to data to be read being stored in a cache slot of the remote storage device.

5. A method, according to claim 4, further comprising:
reading data from the disk of the remote storage area into the temporary storage area; and
merging the data to be read stored in the cache slot with data from a disk in the temporary storage area.

6. A method, according to claim 4, further comprising:
prior to the remote storage area determining if there is data to be read stored in a cache slot of the remote storage device, the remote storage device writing at least a portion of the data from at least one cache slot of the remote storage device to a disk of the remote storage device.

7. Computer software, stored in a computer-readable medium, that reads desired data while the data is being transferred from the local storage device to a remote storage device, comprising:
executable code that returns the data from the cache if the desired data is entirely in a cache of the local storage device, wherein the cache of the local storage device contains data written to the local storage device begun after a first time and before a second time that is associated with a first chunk of data and contains data written to the local storage device begun after the second time that is associated with a second chunk of data different from the first chunk of data and wherein after completion of all writes associated with the first chunk of data, the local storage device initiates transfer of writes associated with the first chunk of data to the remote storage device, an order of the transfer from the local storage device to the remote storage device of data from the first chunk being independent of an order in which data writes of the first chunk are provided to the local storage device; and executable code that reads data from the remote storage device to the local storage device and merges the data from the remote storage device with data from the cache of the local storage device at the local storage device if the desired data is not entirely in the cache of the local storage device;

executable code that creates a temporary storage area at the local storage device if there is data from the local storage device that is to be used prior to reading data from the remote storage device to the local storage device;

executable code that locks slots of the local storage device that correspond to data from the local storage device that is to be used prior to creating a temporary storage area;

executable code that unlocks the slots of the local storage device that correspond to data from the local storage device that is to be used after merging the data.

8. Computer software, according to claim 7, wherein the temporary storage area is a scratch slot.

9. Computer software, according to claim 7, wherein the data from the local storage area is merged on top of data from the remote storage area.

10. Computer software, according to claim 7, further comprising:
executable code that allocates a temporary storage area at the remote storage device in response to data to be read being stored in a cache slot of the remote storage device.

11. Computer software, according to claim 10, further comprising:
executable code that reads data from the disk of the remote storage area into the temporary storage area; and
executable code that merges the data to be read stored in the cache slot with data from a disk in the temporary storage area.

12. Computer software, according to claim 10, further comprising:
executable code that writes at least a portion of the data from at least one cache slot of the remote storage device to a disk of the remote storage device prior to the remote storage area determining if there is data to be read stored in a cache slot of the remote storage device.

* * * * *